US012587438B2

(12) United States Patent
Towfiq et al.

(10) Patent No.: US 12,587,438 B2
(45) Date of Patent: Mar. 24, 2026

(54) METHODS AND APPARATUS FOR NETWORK ANALYSIS

(71) Applicant: PROMPTLINK COMMUNICATIONS, INC., Oceanside, CA (US)

(72) Inventors: Foad Towfiq, Vista, CA (US); Alexander Podarevsky, Oceanside, CA (US)

(73) Assignee: Promptlink Communications, Inc., Oceanside, CA (US)

( * ) Notice: Subject to any disclaimer, the term of this patent is extended or adjusted under 35 U.S.C. 154(b) by 0 days.

(21) Appl. No.: 18/616,868

(22) Filed: Mar. 26, 2024

(65) Prior Publication Data
US 2024/0333584 A1     Oct. 3, 2024

Related U.S. Application Data

(60) Provisional application No. 63/569,642, filed on Mar. 25, 2024, provisional application No. 63/454,907, filed on Mar. 27, 2023.

(51) Int. Cl.
*G06F 15/173*     (2006.01)
*H04L 41/0677*     (2022.01)
*H04L 41/12*     (2022.01)
*H04L 41/16*     (2022.01)

(52) U.S. Cl.
CPC .......... *H04L 41/0677* (2013.01); *H04L 41/12* (2013.01); *H04L 41/16* (2013.01)

(58) Field of Classification Search
CPC ...... H04L 41/0677; H04L 41/12; H04L 41/16
See application file for complete search history.

(56) References Cited

U.S. PATENT DOCUMENTS

| | | | |
|---|---|---|---|
| 2020/0174904 A1 | 6/2020 | Desai et al. | |
| 2022/0353143 A1* | 11/2022 | Hill | H04L 41/0813 |
| 2023/0103817 A1* | 4/2023 | Ferreira | G06F 9/44505 |
| | | | 706/12 |
| 2023/0128199 A1* | 4/2023 | Griffin | G06F 11/3075 |
| | | | 709/224 |
| 2024/0176878 A1* | 5/2024 | Patankar | G06F 21/554 |

OTHER PUBLICATIONS

International Search Report and Written Opinion received for PCT Patent Application No. PCT/US2024/021525, mailed on Jun. 17, 2024, 17 pages.

(Continued)

*Primary Examiner* — Joseph R Maniwang
(74) *Attorney, Agent, or Firm* — YHE Law LLP

(57) ABSTRACT

Various techniques for analyzing data networks with impaired network components, recording network telemetry data and labeling the information for use in training one or more machine learning algorithms is described. The machine learning algorithms trained in this way are used to detect impaired network components and/or noise on operational data networks.

20 Claims, 24 Drawing Sheets

800

802
Create a first network condition in a first data network, wherein the first network condition impairs operation of one or more network components of the first data network.

804
While the first network condition impairs the operation of one or more network components of the first data network, recording first telemetry data produced by a plurality of network components of the first data network.

806
Record topology information about the first data network.

808
Associate the first telemetry data with a characterization of the first network condition and the topology information about the first data network.

810
Train one or more machine learning models using the first telemetry data in association with the characterization of the first network condition and the topology information about the first data network.

(56) References Cited

OTHER PUBLICATIONS

Pnm Best Practices Primer: Data Over Cable Service Interface Specification Proactive Network Maintenance Primer for PNM Best Practices in HFC Networks (DOCSIS 3.1) CM-GL-PNM-3.1-V03-220118 Released, Retrieved from the Internet: URL: https://www.academia.edu/26432768/Data Over Cable Service Interface Specifications DOCSIS 3 1 Physical Layer Specification., Jan. 18, 2022, pp. 1-191.

Jing et al., "A study on network fault knowledge acquisition based on support vector machine", Proceedings of the Fourth International Conference on Machine Learning and Cybernetics, Guangzhou, Aug. 18-21, 2005, XP031438659, ISBN: 978-0-7803-9091-1, Aug. 18, 2005, 6 pages.

Raouf Boutaba, "A comprehensive survey on machine learning for networking: evolution, applications and research opportunities", Journal of Internet Services and Applications, Biomed Central Ltd, London, UK, vol. 9, No. 1, XP021257840, ISSN: 1867-4828, DOI:10.1186/S13174-018-0087-2, abstract; figures 2, 3, Jun. 21, 2018, pp. 1-99.

* cited by examiner

202

210
PORT 1
PORT 2
PORT 3
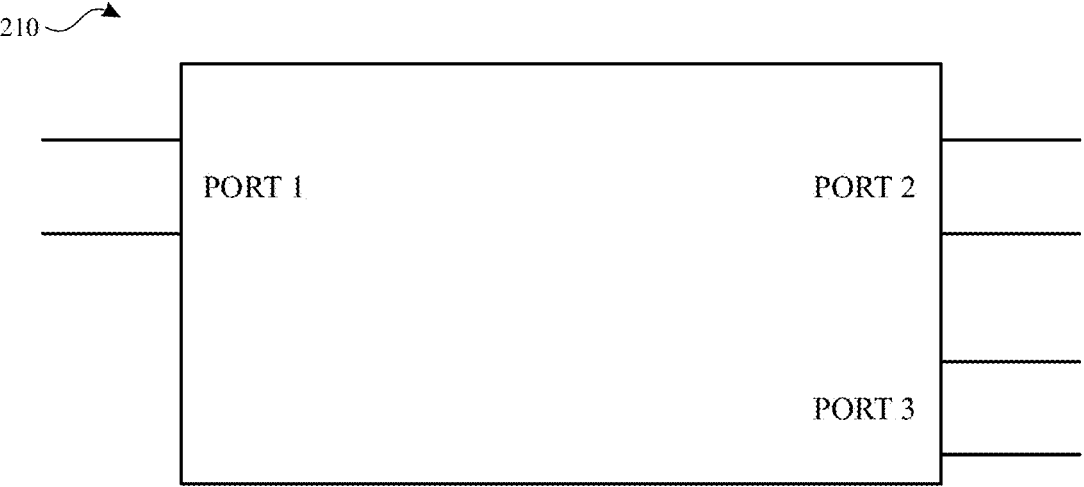
210A
$$[S] \;=\; \begin{bmatrix} S_{11} & S_{12} & S_{13} \\ S_{21} & S_{22} & S_{23} \\ S_{31} & S_{32} & S_{33} \end{bmatrix}$$
*FIG. 2B1*

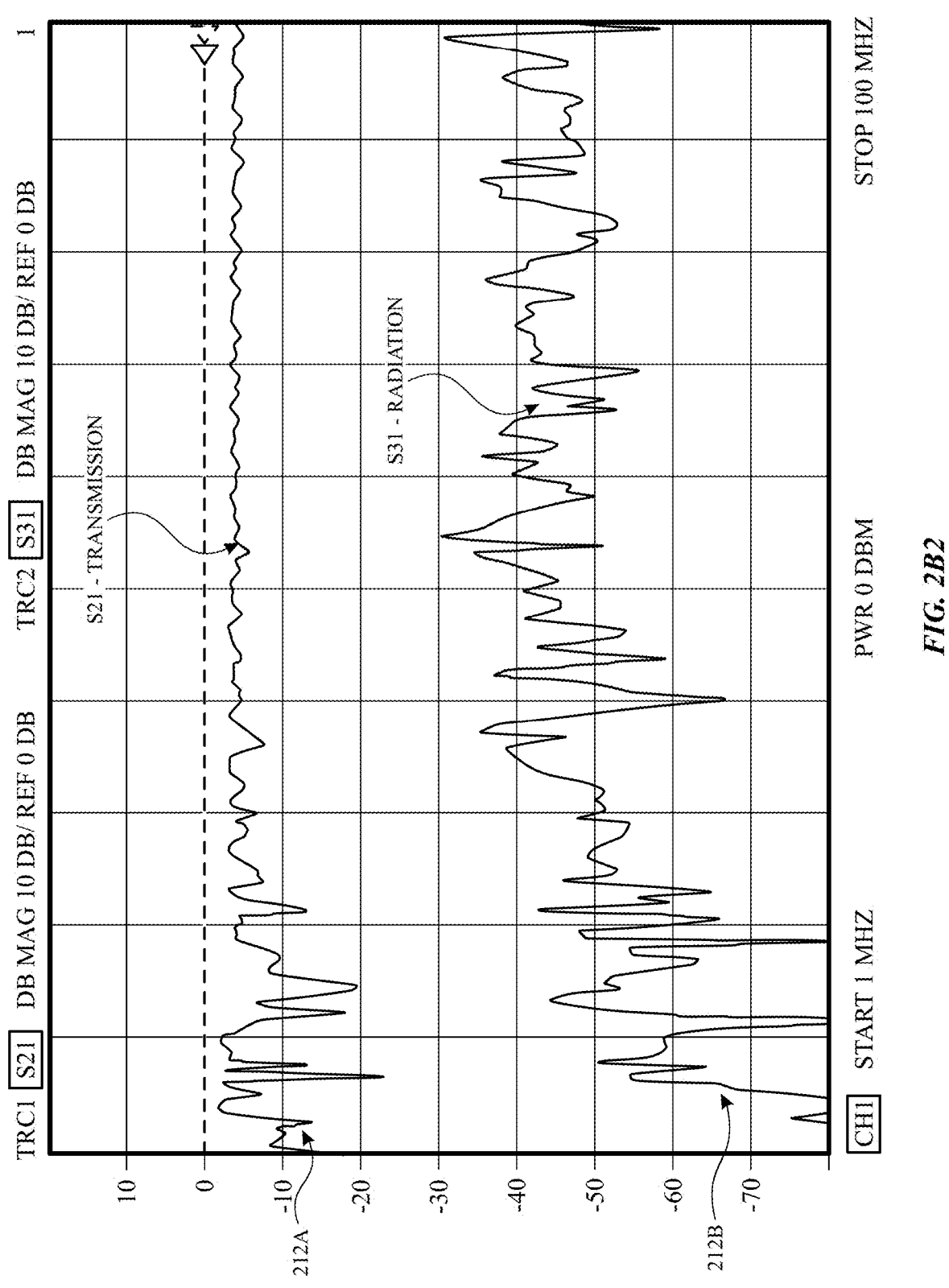
*FIG. 2B2*

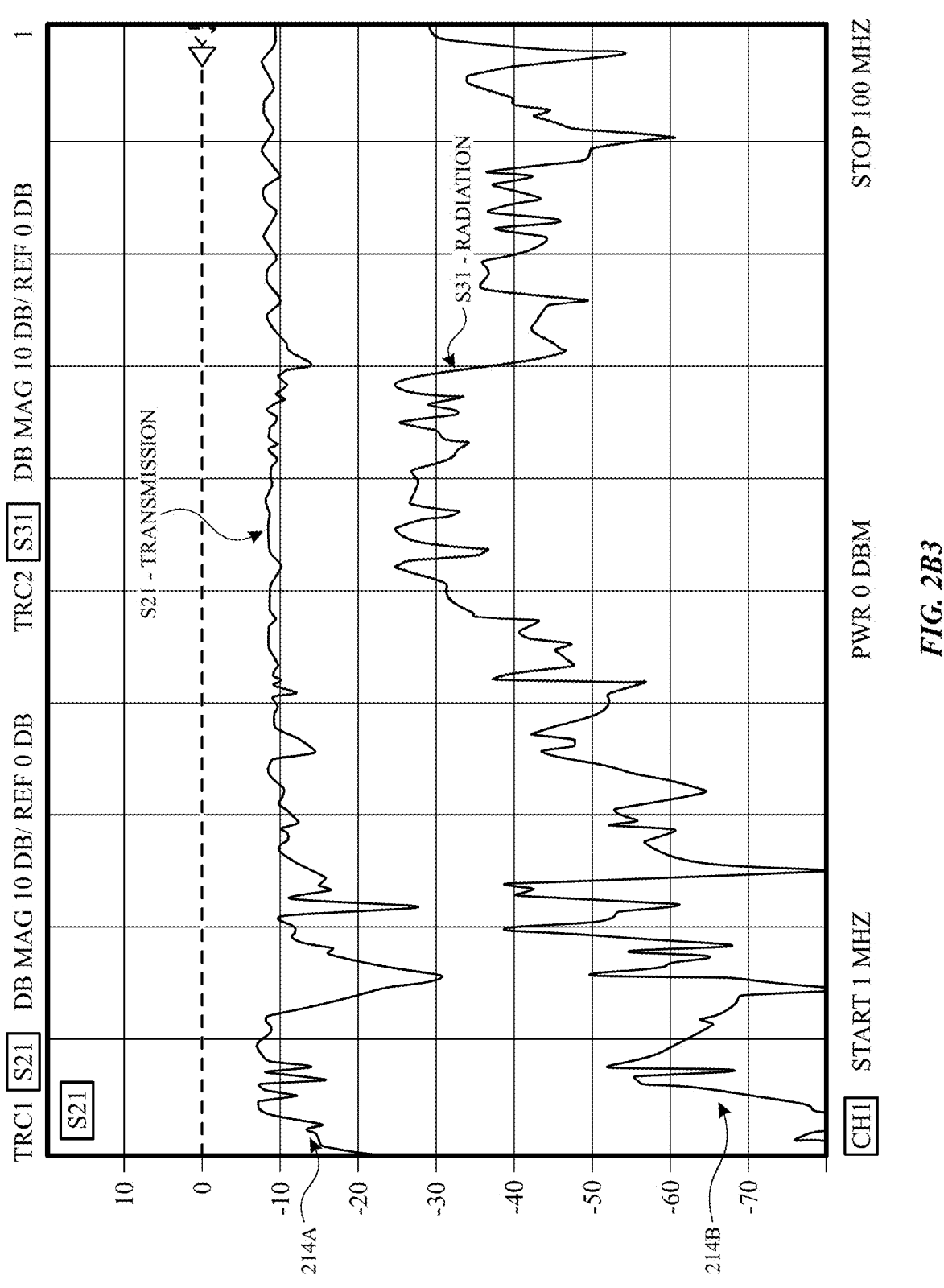
*FIG. 2B3*

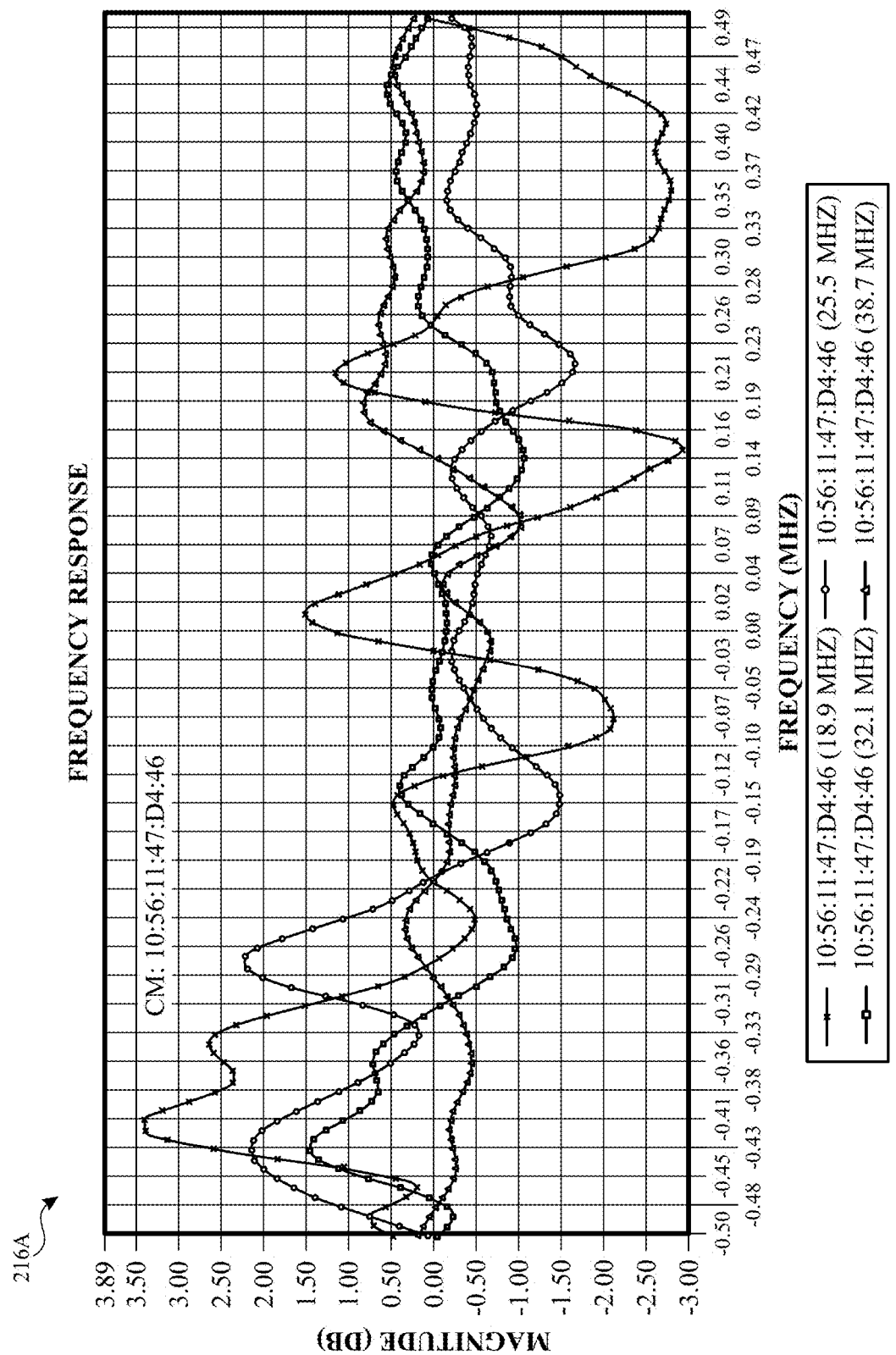
*FIG. 2B4-1*

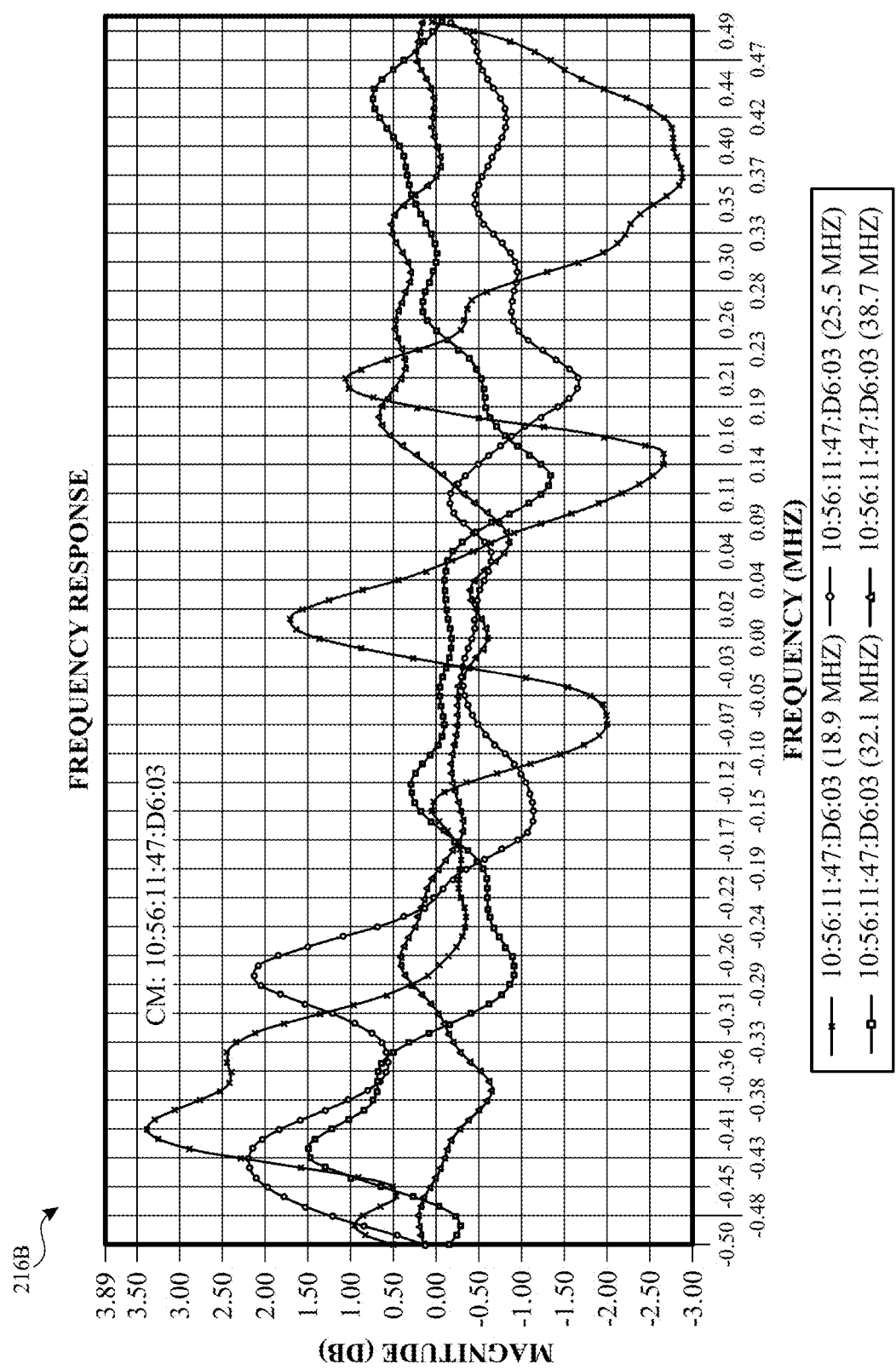
FIG. 2B4-2

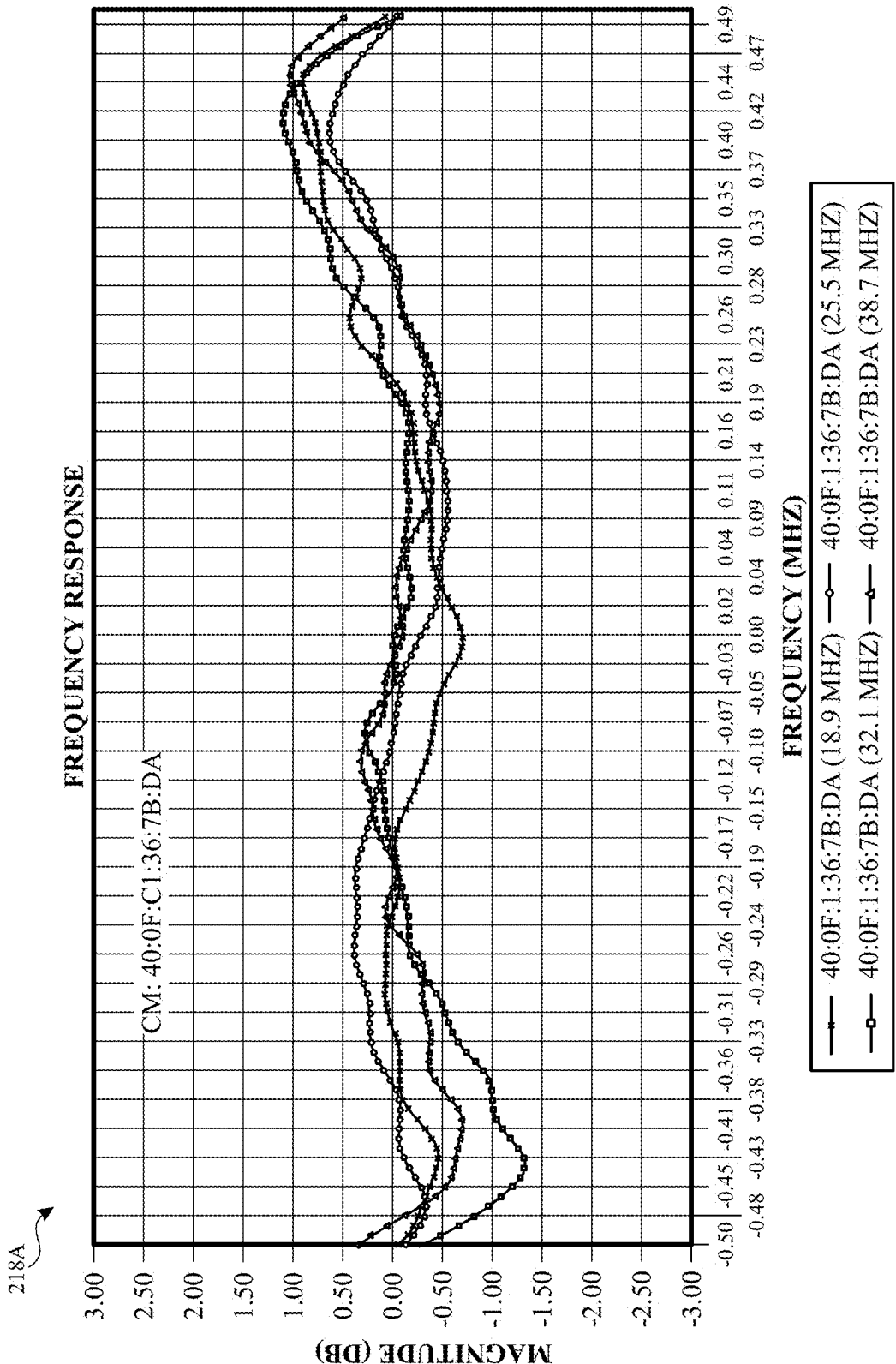
*FIG. 2B5-1*

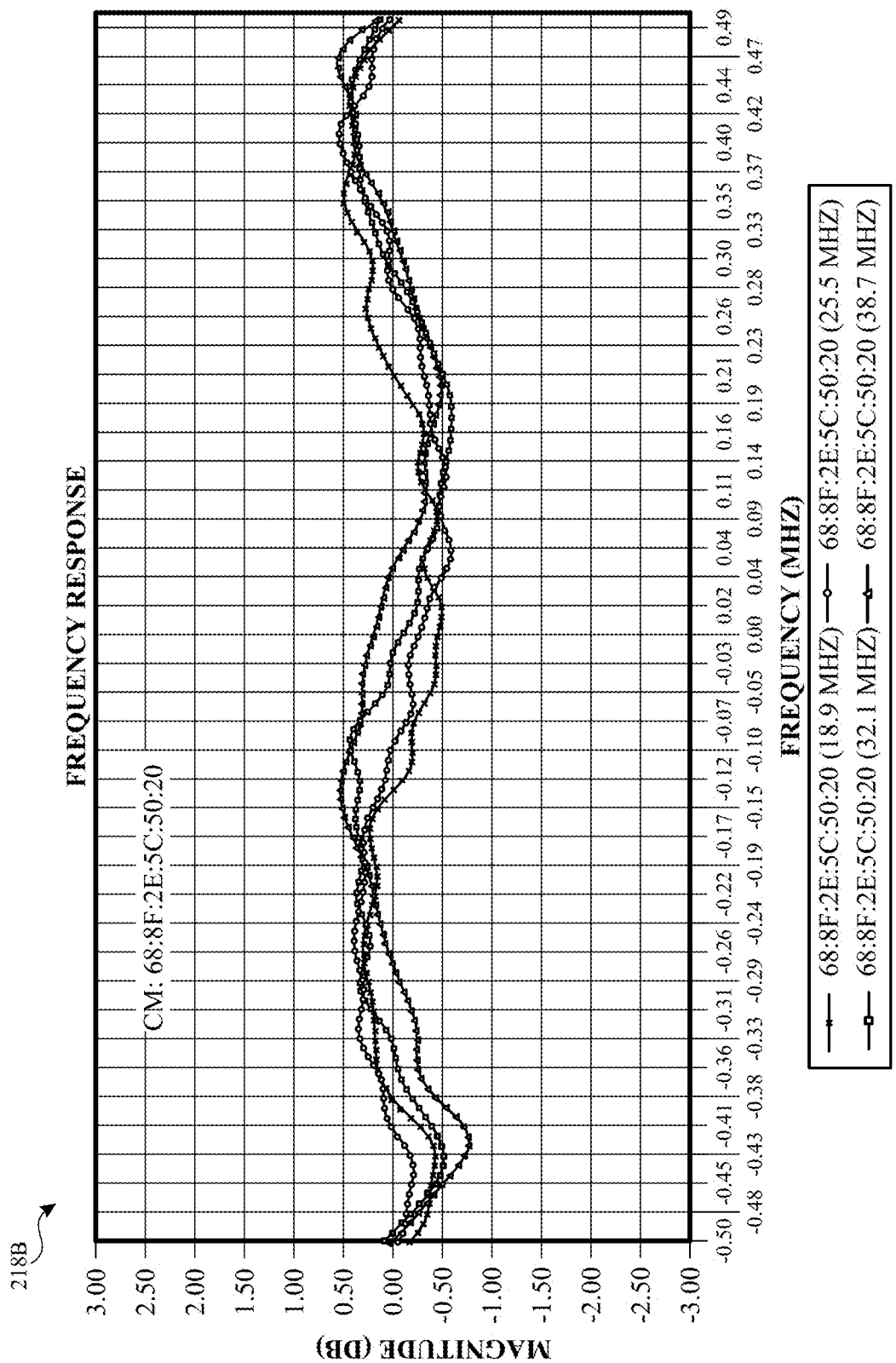
FIG. 2B5-2

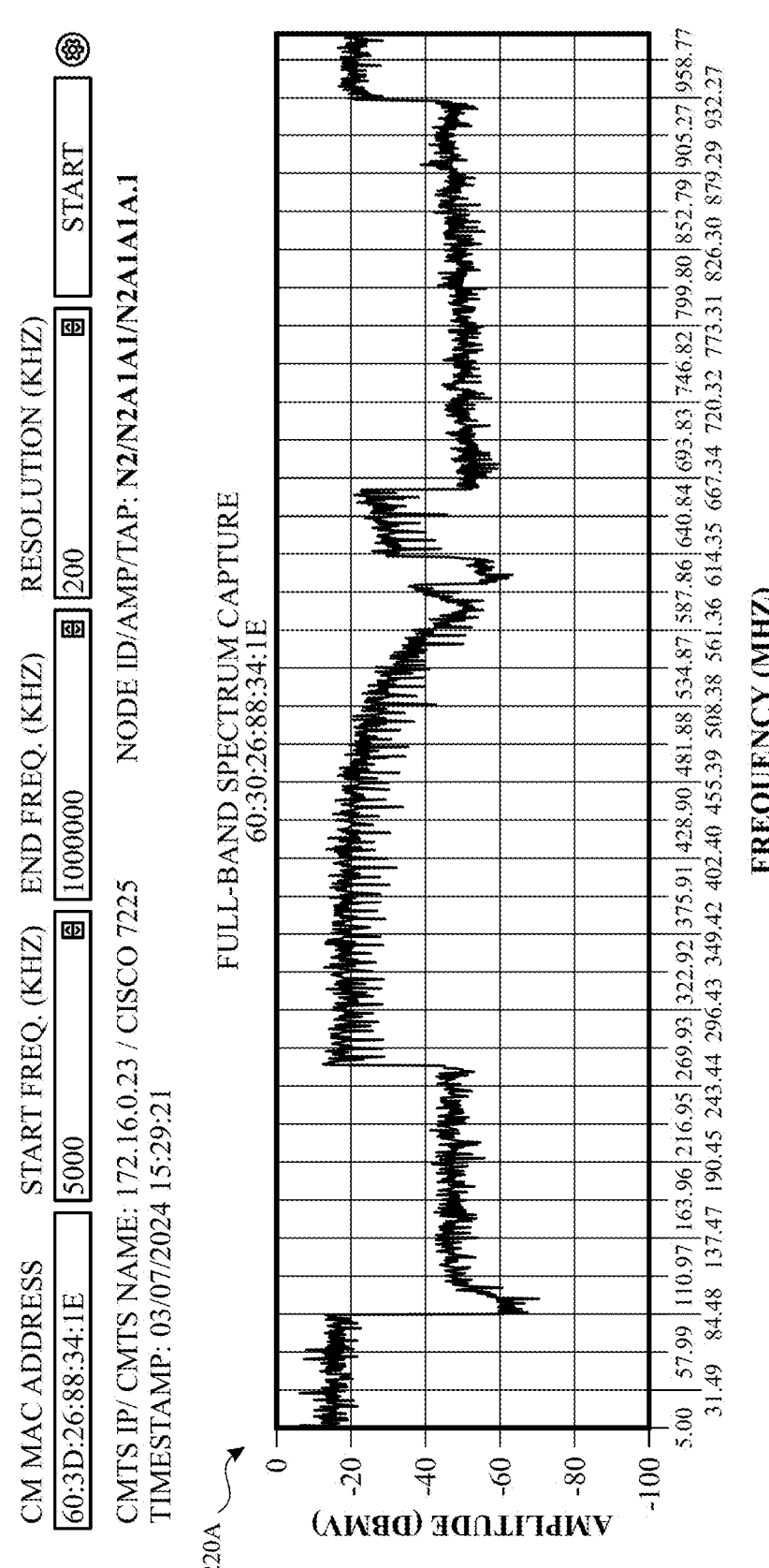
*FIG. 2B6-1*

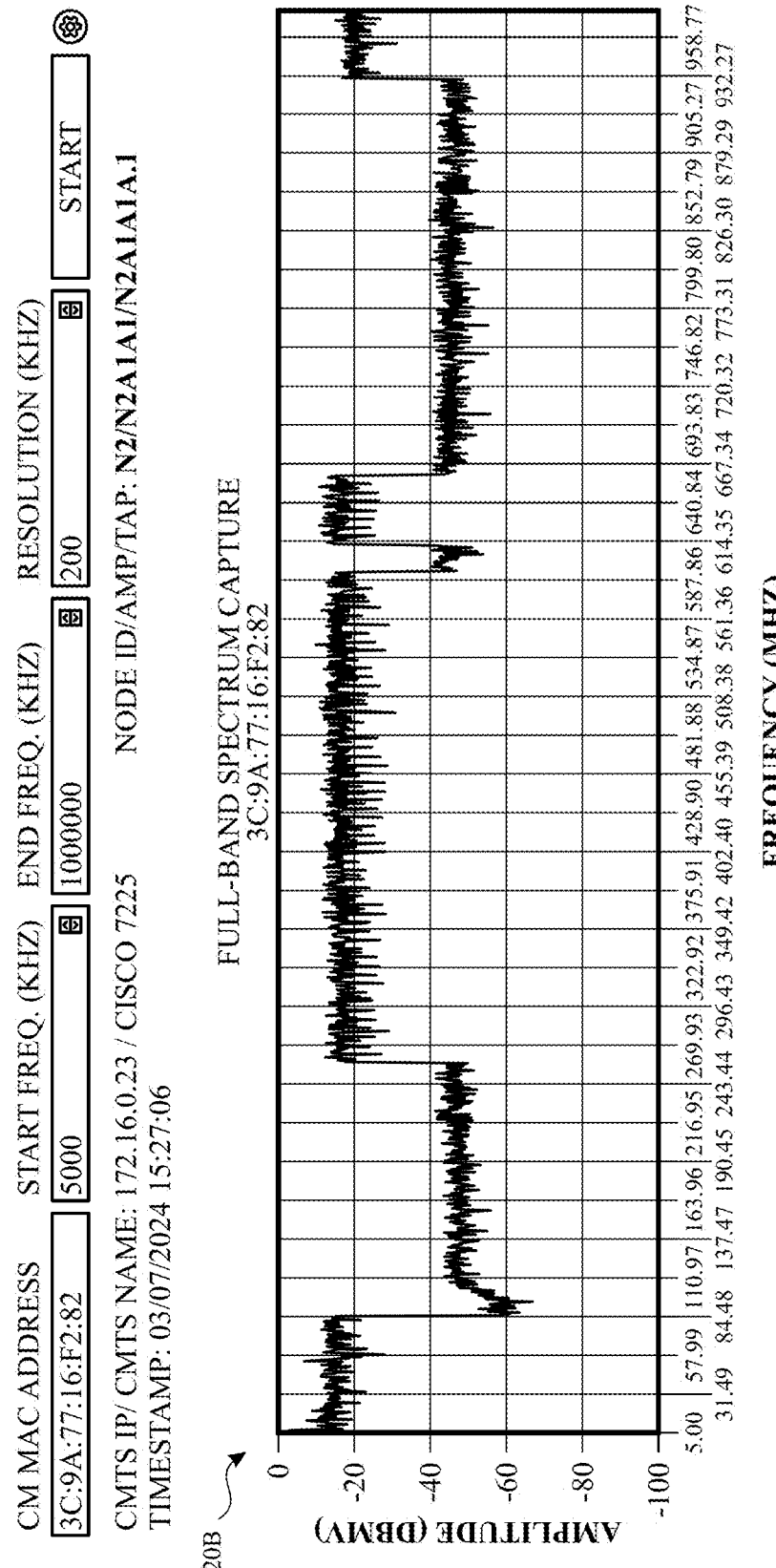
*FIG. 2B6-2*

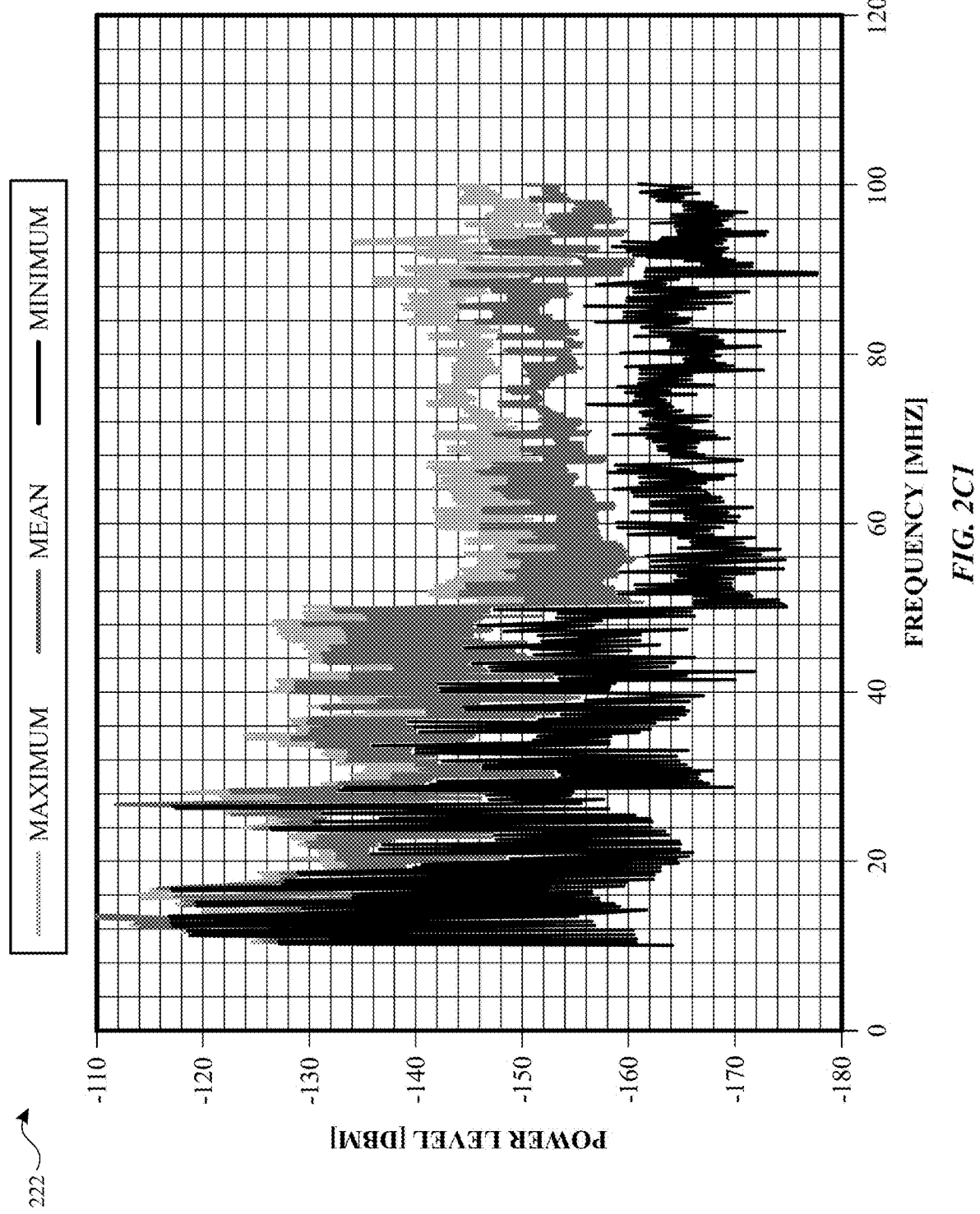
*FIG. 2C1*

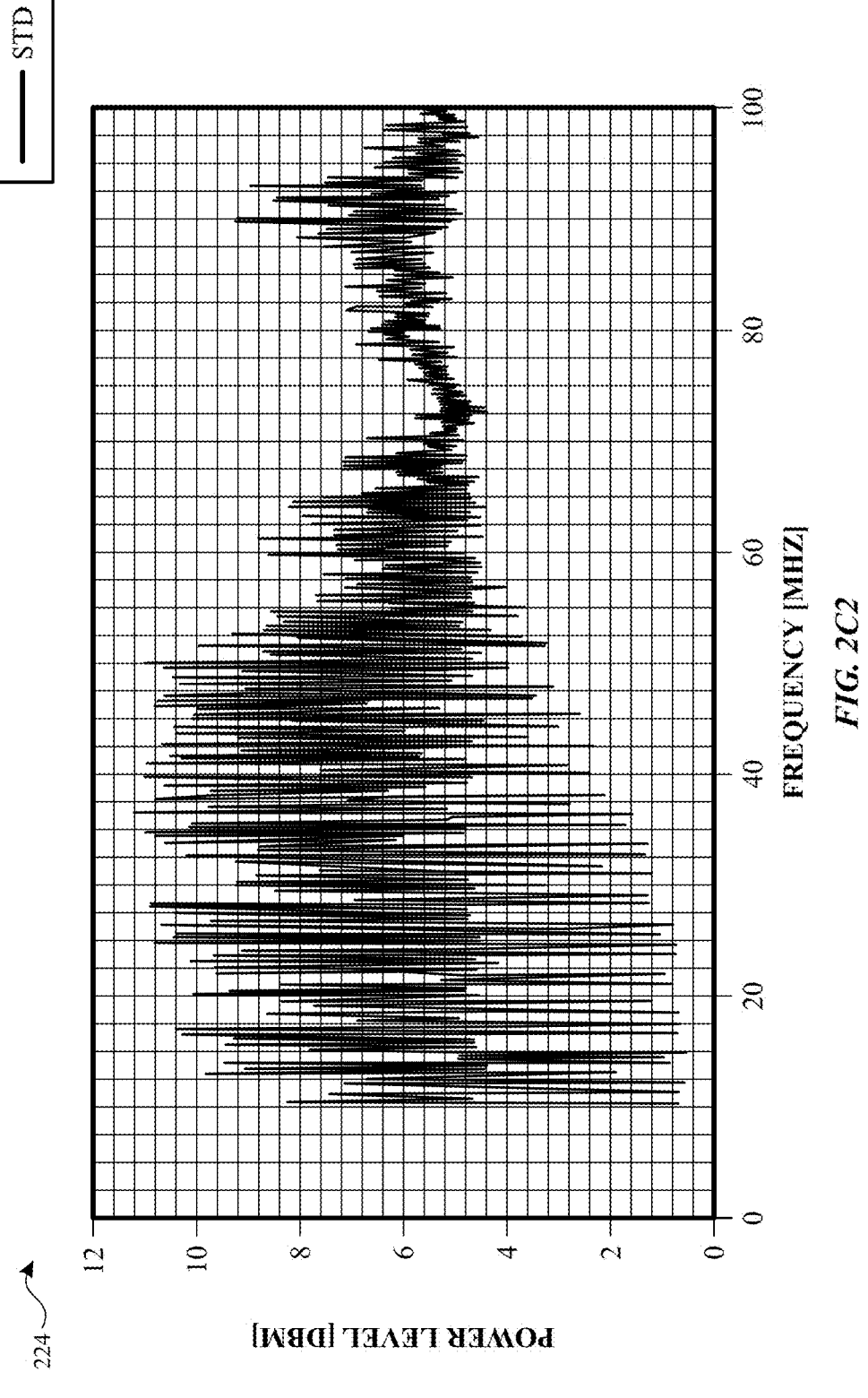
FIG. 2C2

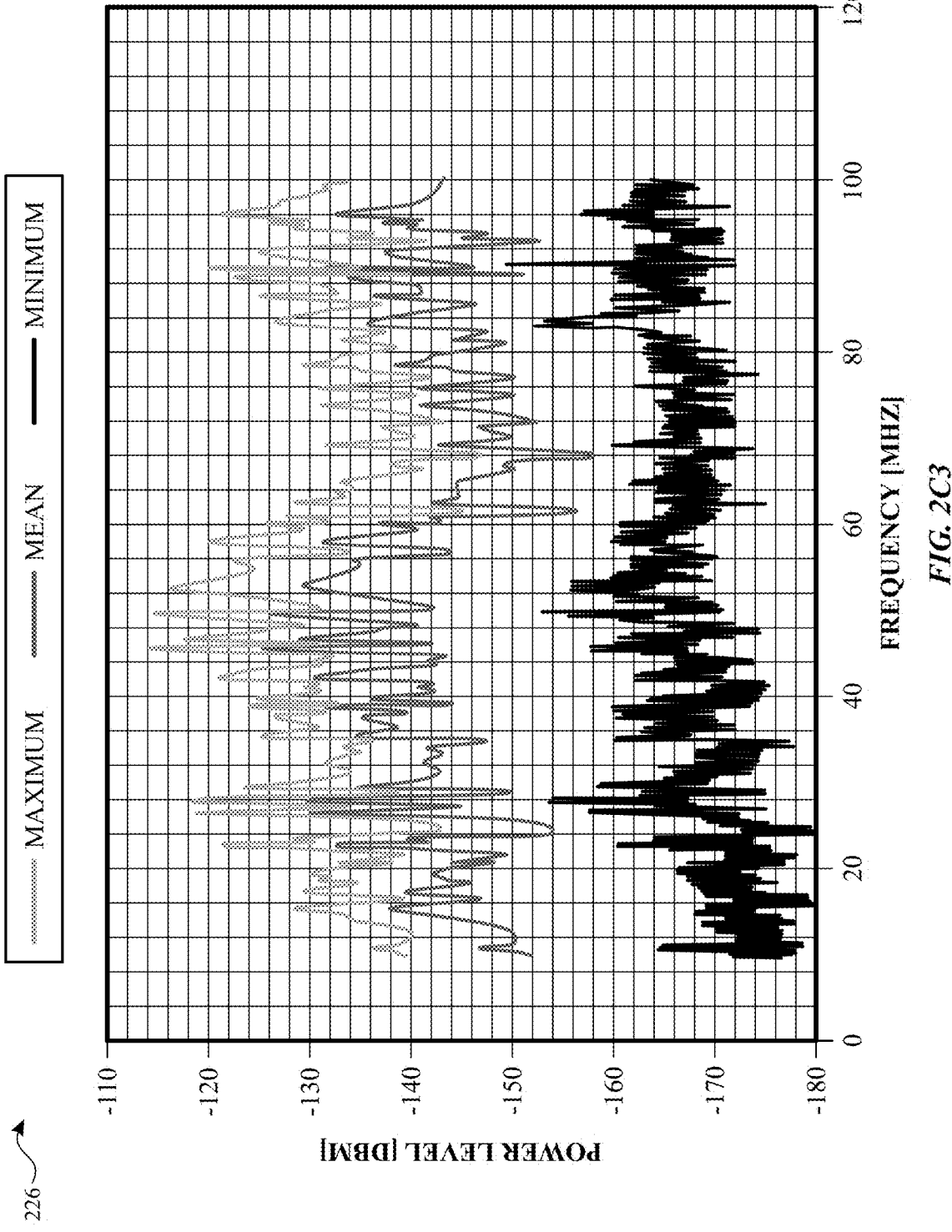
FIG. 2C3

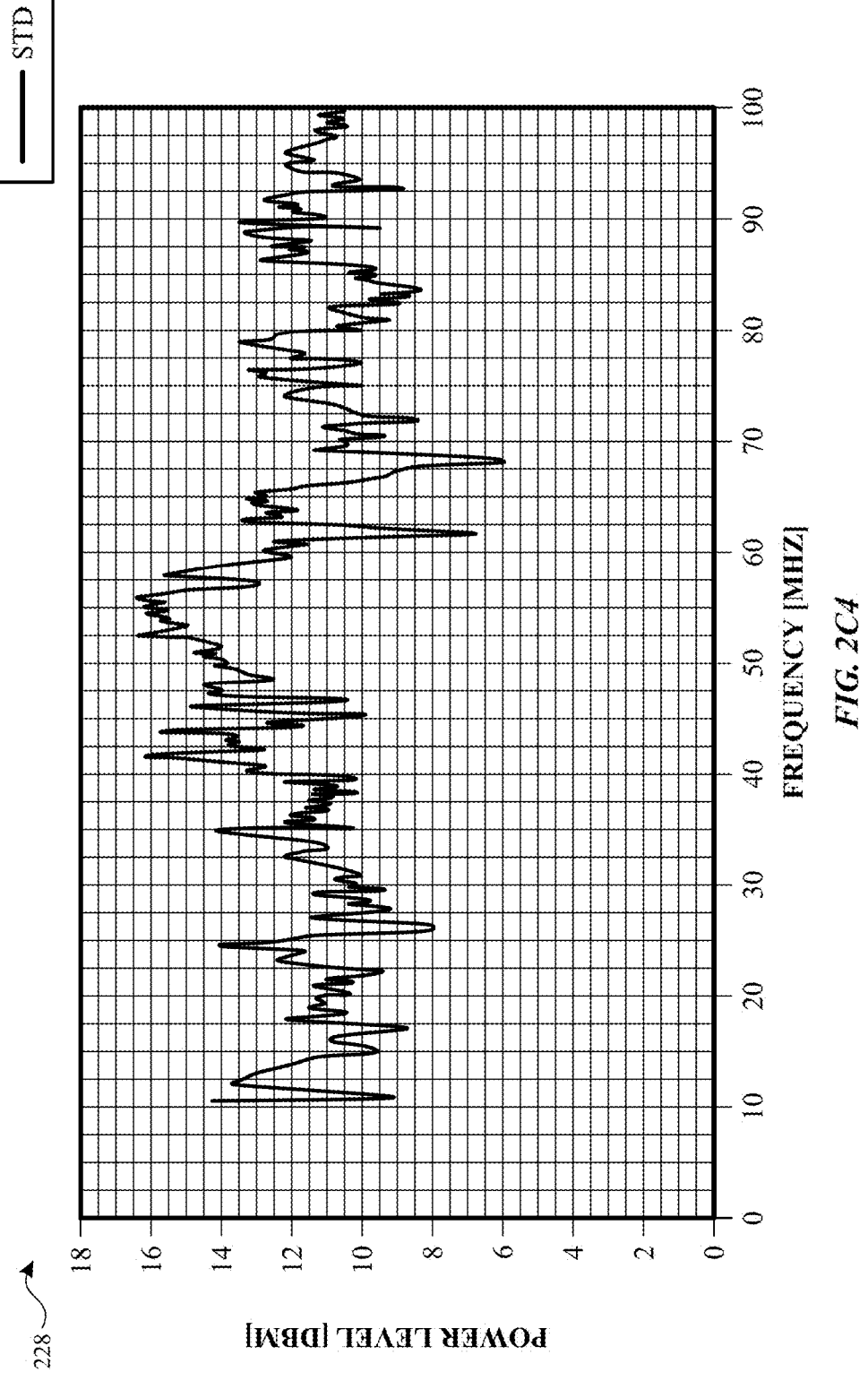
FIG. 2C4

MDU
DISTRIBUTION
NETWORK

MDU
SWITCH

AMPLIFIER
602

800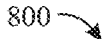

---

802
Create a first network condition in a first data network, wherein the first network condition impairs operation of one or more network components of the first data network.

---

804
While the first network condition impairs the operation of one or more network components of the first data network, recording first telemetry data produced by a plurality of network components of the first data network.

---

806
Record topology information about the first data network.

---

808
Associate the first telemetry data with a characterization of the first network condition and the topology information about the first data network.

---

810
Train one or more machine learning models using the first telemetry data in association with the characterization of the first network condition and the topology information about the first data network.

METHODS AND APPARATUS FOR NETWORK ANALYSIS

CROSS-REFERENCE TO RELATED APPLICATIONS

This application claims priority to U.S. Provisional Application No. 63/569,642, entitled "METHODS AND APPARATUS FOR NETWORK ANALYSIS," filed Mar. 25, 2024 and to U.S. Provisional Patent Application Ser. No. 63/454,907, entitled "METHODS AND APPARATUS FOR GENERATING SIMULATED TRAINING DATA", filed Mar. 27, 2023, the contents of which are hereby incorporated by reference in their entireties for all purposes.

FIELD

The present disclosure relates generally to the generation and labeling of training data used to develop machine learning algorithms that assist with identifying and troubleshooting noise and/or impaired network components and/or identifying the topology of a hybrid fiber coaxial (HFC) network. In particular, the described embodiments relate to methods and apparatus for generating training data by simulating the occurrence of noise and/or impaired network components in a testing or laboratory environment.

BACKGROUND

Service providers (e.g., operators) provide customers (e.g., subscribers) with services, such as multimedia, audio, video, telephony, data communications, wireless networking, and wired networking. Service providers provide such services by deploying one or more electronic devices at their customers' premises, and then connecting the deployed electronic device to the service provider's network or infrastructure. The deployed electronic devices are often called Customer Premise Equipment (CPE). For example, a cable company delivers media services to customers by connecting an electronic device, such as a set-top box or a cable modem, located at customer's premise to the cable company's network. This CPE is the device that the service provider uses to deliver the service to the customer.

Networks, such as those maintained by service providers or their customers, may have noise caused by impaired network components, which can cause service degradation and customer dissatisfaction. Examples of impaired network components include loose or corroded connectors, damaged cables, and flooded amplifiers. Over time, as the network ages, the severity and number of impaired network components may increase. Service providers face challenges in identifying the type of noise in the network and localizing the noise in the network to fix the impaired network components in a timely manner so as to limit the impacts of service degradation or outage of their customers.

SUMMARY

Some techniques for identifying impaired network components on a data network are unreliable and/or inaccurate. For example, some techniques do not identify particular types of impaired network components and/or are unable to identify the location where noise caused by the impaired network components is entering into or originating within the network. Other techniques do not prioritize the repair of impaired network components based on the severity of the network degradation and/or the number of affected customers.

In some embodiments, a method is described. The method comprises: creating a first network condition in a first data network, wherein the first network condition impairs operation of one or more network components of the first data network; while the first network condition impairs the operation of one or more network components of the first data network, recording first telemetry data produced by a plurality of network components of the first data network; recording topology information about the first data network; associating the first telemetry data with a characterization of the first network condition and the topology information about the first data network; and training one or more machine learning models using the first telemetry data in association with the characterization of the first network condition and the topology information about the first data network.

In some embodiments, a method is described. The method comprises: at a computer system: receiving first telemetry data produced by a plurality of network components of a first data network that includes a first network condition that impairs operation of one or more network components of the first data network, wherein the first telemetry data was produced while the first network condition impairs the operation of one or more network components of the first data network; receiving (or determining) topology information about the first data network, wherein the topology information about the first data network is associated with a characterization of the first network condition and the first telemetry data; and training one or more machine learning models using the first telemetry data in association with the characterization of the first network condition and the topology information about the first data network.

Methods for creating training data usable for developing a system capable of autonomously identifying impaired network components on a data network are described. The embodiments disclosed herein describe methods for generating large volumes and varieties of training data that can be used to develop machine learning algorithms configured to identify and localize network conditions negatively affecting performance of a data network.

BRIEF DESCRIPTION OF THE DRAWINGS

For a better understanding of the various described embodiments, reference should be made to the Detailed Description of Embodiments below, in conjunction with the following drawings in which like reference numerals refer to corresponding parts throughout the figures.

FIG. 2B1 shows an exemplary technique for characterizing an impaired network component as a transmission line model, in accordance with some embodiments.

FIG. 2B2 illustrates exemplary S-parameters for a hard-line coaxial cable with a broken radial shield, in accordance with some embodiments.

FIG. 2B3 illustrates exemplary S-parameters for a corroded power splitter, in accordance with some embodiments.

FIGS. 2B4-1 and 2B4-2 illustrates exemplary In-Channel Equalizer Frequency Response (ICEFR) graphs for two distinct cable modems on the same network that are affected by a loose splice connector on a hardline coaxial cable, in accordance with some embodiments.

FIGS. 2B5-1 and 2B5-2 illustrate exemplary In-Channel Equalizer Frequency Response (ICEFR) graphs for two distinct cable modems on the same network that are affected by a defective tap, in accordance with some embodiments.

FIGS. 2B6-1 and 2B6-2 illustrate exemplary Full Band Downstream Spectrum graphs for two distinct cable modems on a network that includes a corroded tap, in accordance with some embodiments.

FIG. 2C1 illustrates exemplary maximum, mean and minimum noise spectrums for different frequencies for a noisy LED light, in accordance with some embodiments.

FIG. 2C2 illustrates an exemplary noise spectrum standard deviation for a noisy LED light, in accordance with some embodiments.

FIG. 2C3 illustrates exemplary maximum, mean and minimum noise spectrums for different frequencies for a noisy LED light, in accordance with some embodiments.

FIG. 2C4 illustrates an exemplary noise spectrum standard deviation for a noisy LED light, in accordance with some embodiments.

FIG. 3 shows an exemplary electronic device, in accordance with some embodiments.

FIG. 4 shows an exemplary movable rack capable of supporting multiple network components in a laboratory or testing environment.

FIG. 8 is a flow diagram illustrating a method for analyzing a data network, in accordance with some embodiments.

DETAILED DESCRIPTION OF EMBODIMENTS

Figure 1:
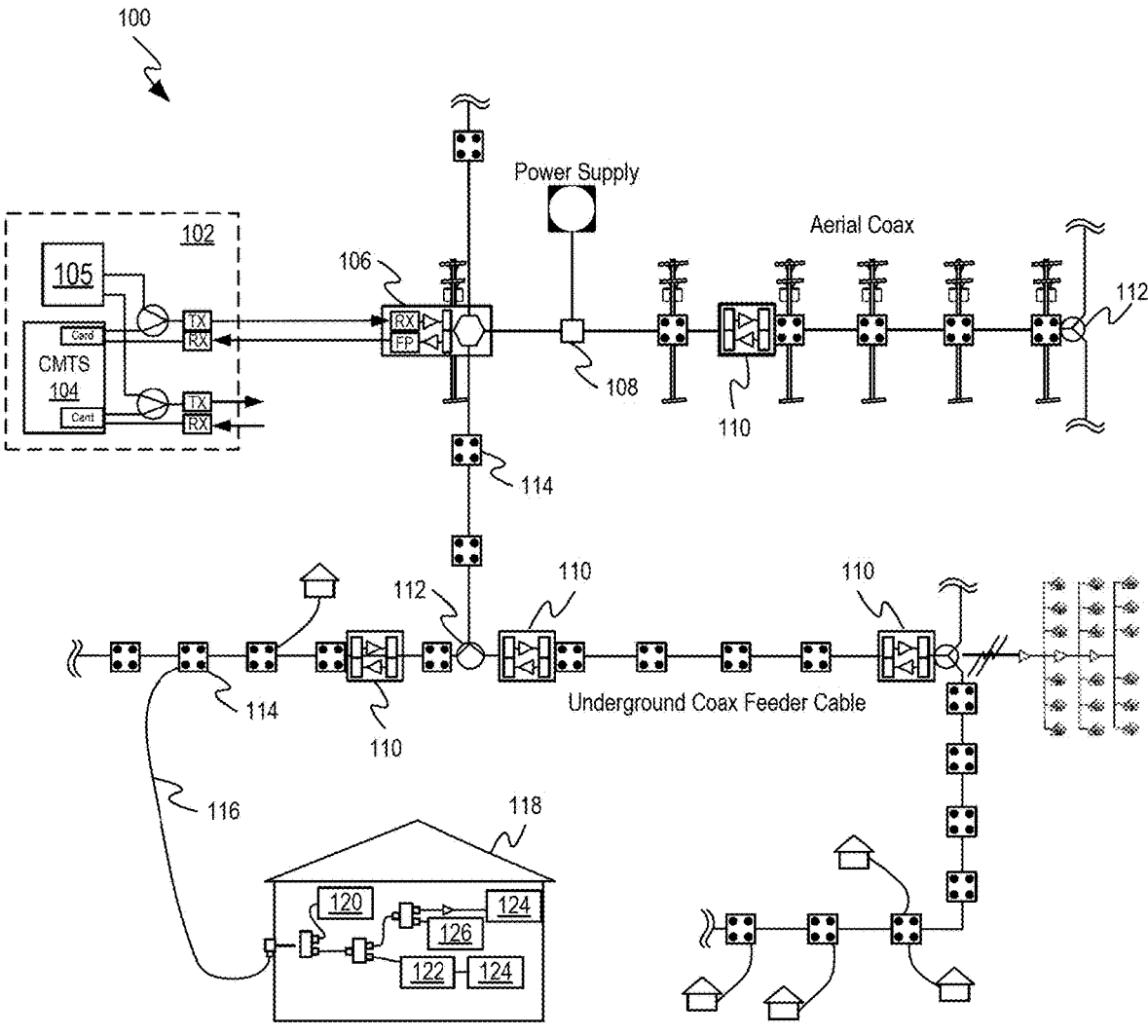
FIG. 1 shows a map illustrating an exemplary data network that includes the different types of network components that can be associated with a suspected point of impairment.

The following detailed description sets forth exemplary methods, parameters, and the like. It should be recognized, however, that such description is not intended as a limitation on the scope of the present disclosure, but is instead provided as a description of exemplary embodiments.

In some embodiments, a system for identifying impaired network components on a data network can be trained using training data based solely upon problems occurring on a commercial data network. Unfortunately, real-world data may not occur with the frequency or variety needed to develop a range of training data suitable for training the system to identify a sufficiently wide range of possible problems occurring on the commercial data network. Thoroughly cataloging and identifying the myriad combinations of noise issues that can occur on the commercial data network is a large task and relying solely on readings taken after noise and/or an impaired network component is identified is not typically sufficient to create a large enough repository of data to train the system to identify and troubleshoot potential solutions to fix problems occurring on a cable network.

Furthermore, adding to the problem of limited amounts of data is that there are often multiple sources of noise. There is noise entering the data network from outside (ingress) that by itself can have different sources, such as impulse noise from machines in a nearby factory, noise from street lights and/or power lines. Noise can also occur unintentionally within the data network by an amplifier overload causing non-linear distortion or corrosion in one or more network components generating common path distortion. Network degradation can sometimes be caused by combined noise from ingress and non-linear distortions, such as inter modulation distortions.

One solution to this problem is to model the data network by clustering all of the network components making up a data network onto various racks in a lab environment. This allows for the testing of multiple scenarios without impacting the service quality of an operational data network. One reason similar testing has not previously been done is that gathering all the components together results in any ambient noise affecting one network component also affecting neighboring components to a degree that they would not in a commercial network where components are separated by larger distances of at least 100 to 200 feet. To address this issue, the lab environment can be equipped with multiple Faraday cages that keep the network component or network components being subject to an impairment condition isolated from other network components making up the network. In this way, noise can be applied to the network in a very controlled manner without unintentionally affecting other components.

When the sources of noise introduced to the data network are controlled in a laboratory environment, labeling of the resulting data being collected from the data network can be labeled without the need for technicians to perform in-depth analysis and/or make educated guesses as to what is the actual cause of a particular network degradation because the source of the network degradation is known. This allows for the modeling of quite complex noise scenarios with little to no effort needed to identify a particularly complex impairment scenario.

These and other embodiments are discussed below with reference to FIGS. 1-7. Those skilled in the art, however, will readily appreciate that the detailed description given herein with respect to these figures is for explanatory purposes only and should not be construed as limiting.

FIG. 1 shows a network map illustrating different network components used in operating a data network 100. While the teachings of this application could be applied to many different types of data networks, a hybrid fiber coaxial (HFC) data network is used for exemplary purposes only and should not be construed as limiting. An HFC data network generally includes a headend or central office 102 where data network 100 interfaces with a larger internet fiberoptic backbone. Central office 102 includes CUTS 104, which is responsible for handling inbound and outbound data associated with data network 100. Also located at central office 102 is data collection engine 105, which as depicted is capable of transmitting and receiving data and/or configured to transmit and receive data from data network 100. Central office 102 is generally connected by fiber lines to a fiber node 106 by fiber lines that are typically less than 20 km in length and can be configured as above or below ground fiber runs. While only a single fiber node 106 is depicted in FIG. 1 it should be appreciated that data network 100 can include multiple fiber nodes. Coaxial cables leaving fiber node 106 can be distributed above or below ground as illustrated in FIG. 1. The aerial coaxial branch includes a power injector 108, which can be configured to provide additional power for longer coaxial cable runs. Data network 100 can also include amplifiers 110 for increasing the signal strength of traffic travelling along coaxial cable of data network 100. Data network 100 also includes directional couplers 112, which manage the distribution of data along different branches of data network 100. Network taps 114, in addition to connecting the residential and commercial users to the network, allow for checking noise and power levels in various portions of data network 100. Residential or commercial users of data network 100 generally receive their signal by way of a drop cable 116. A particular residence or business, as depicted, can include multiple network components. In particular, exemplary residence 118 includes a cable modem 120, a set top box 122, televisions 124 and telephone 126 that all rely on services provided by data network 100.

Figure 2A:
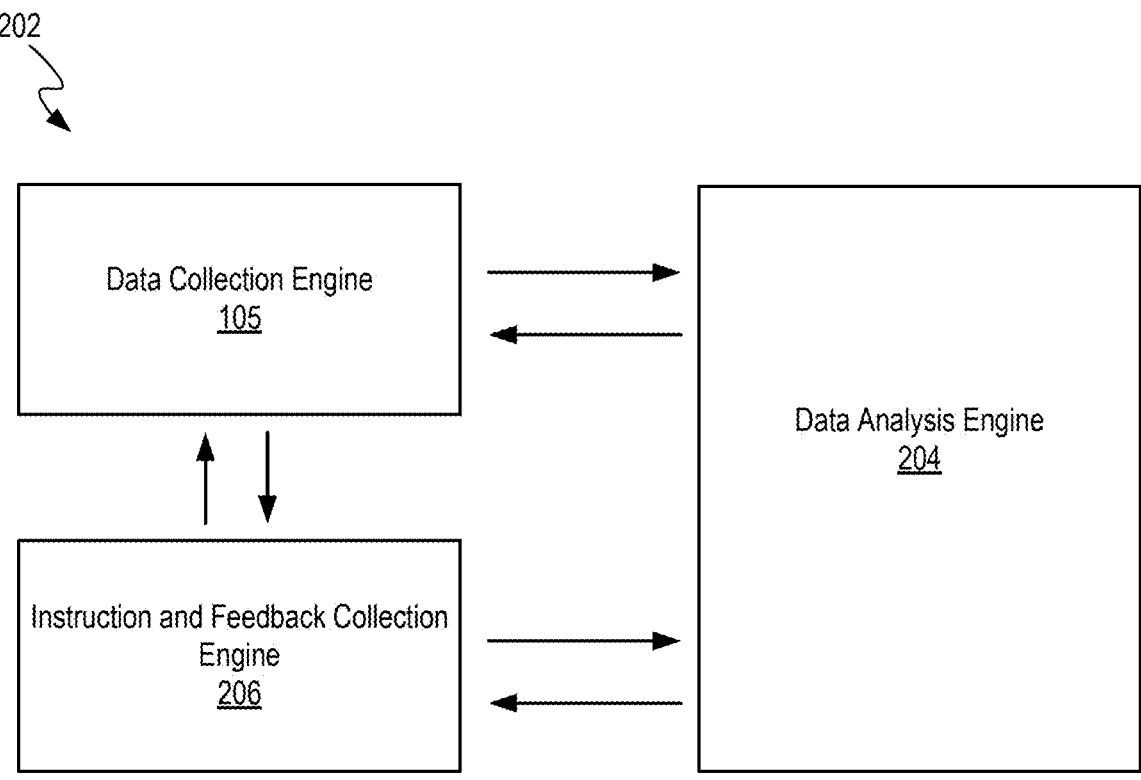
FIG. 2A shows a diagram illustrating a relationship between three components of a noise localization architecture.

FIG. 2A shows a diagram illustrating a relationship between three components of a noise localization architecture 202. In particular, the noise localization architecture includes a data collection engine 105 configured to collect telemetry data from a data network. As shown in FIG. 1 data collection engine 105 can be located in central office 102 to allow for telemetry collection directly from data network 100. Data collection engine 105 can also be configured to evaluate incoming telemetry data to determine in real-time or at predetermined sampling intervals when one or more channels are being adversely affected by upstream noise. This real-time data can be used in many ways. For example, the real-time data can be used to populate a noise alarm dashboard and generate an alert that is communicated to one or more operators or maintainers of the data network that one or more potential problems are occurring within the data network. In addition to generating an alarm in response to trouble on the data network, data collection engine 105 can be configured to increase a rate that it collects telemetry from the data network and send the telemetry on for further analysis to a data analysis engine 204 with a notification of the one or more detected problems. Data collection engine 105 can also be configured as a gathering point for data received by reported customer issues/complaints. Consequently, data collection engine 105 can be configured with a ticketing system configured to track user reported complaints. In some embodiments, instruction and feedback collection engine 206 can be configured to increase collection of telemetry data generated by a bonding group in which the user's CPE (i.e. modem) belongs and then notify data analysis engine 204 of the problems identified by the user for further analysis. In some embodiments, data collection engine 105 can be configured to update or cancel a trouble ticket generated from customer feedback with information gathered from the telemetry data generated by the data network. However, full analysis of the telemetry data is generally performed at data analysis engine 204 as well as the decision on whether to update or cancel the trouble ticket. Data collection engine 105 could also be configured to group the customer trouble ticket with one or more additional system generated trouble tickets at which point the trouble tickets could be sent directly to an instruction and feedback collection engine 206 or processed first by a data analysis engine 204 before being routed to instruction and feedback collection engine 206. Telemetry data indicating a suspected network point of network degradation is forward to a data analysis engine 204. In some embodiments, the evaluation criteria for identifying telemetry data causing upstream noise can be an upstream channel with noise exceeding a threshold noise level.

Data analysis engine 204 includes criteria for characterizing telemetry data received from data collection engine 105 and noise localization algorithms for identifying suspected sources of the noisy upstream channels. Data analysis engine 204 will generally analyze telemetry data over multiple periods of time in order to identify variations in noise generated on a particular upstream channel. Data analysis engine 204 can also be configured to confirm suspected points of network degradation identified in a trouble ticket received from data collection engine 105 should be investigated by technicians and may also provide additional troubleshooting steps that should be performed when investigating a suspected point of network degradation. As mentioned above, data analysis engine 204 can also be employed to merge and/or combine multiple trouble tickets together when telemetry data received indicates a link between problems being experienced by multiple devices operating on the data network. In some embodiments, an action for combination can be initiated when a threshold number of trouble tickets correlate to a particular suspected point of network degradation. This can greatly improve efficiency by avoiding a situation in which multiple network technicians are dispatched to different user residences in order to solve the same problem. In some embodiments, the noise localization algorithms can be updated or fine-tuned using feedback data gathered while troubleshooting detected noise and impaired network components on the data network.

For example, in the event a customer service representative (CSR) is on the phone with a customer complaining of poor data network service, the customer service representative employing the described embodiments is able to check the subscriber's CPE (cable modem) telemetry data. The CSR is then able to check to see if there is a trouble ticket for the segment of network feeding the subscriber's CPE. If there is no current trouble ticket associated with the network issues, the CSR can initiates analysis of the network segment. As part of the data analysis engine 204 analysis results the CSR receives information about the health of the network and a score for the health of the CPE. With this information the CSR can make an informed decision as how to open a trouble ticket and dispatch technicians to fix the issues.

Data analysis engine 204 is also capable of providing and/or configured to provide updates to a network technician at a customer's place of residence. For example, a troubleshooting checklist may instruct the technician to check a health score for a CPE prior to swapping out the CPE. In the event the health score indicates the CPE does not need to be swapped out the technician can instead of swapping the CPE move directly to initiating a trouble ticket to investigate issues related to a network segment of the data network responsible for servicing the customer.

Data analysis engine 204 can also be configured to intercept and validate a certain subset or in some cases all trouble tickets and send out notifications if it determines that a particular trouble ticket is unnecessary. In the event a trouble ticket is deemed to be unnecessary, data analysis engine 204 can be configured to institute a new trouble ticket addressing what is determined to be a more likely cause of the issues that led to creation of the trouble ticket. Alternatively, in the event a trouble ticket is being canceled because data analysis engine 204 determines that competition of a related trouble ticket should have addressed the issue, additional actions could be limited to sending an automated email to a customer asking the customer to confirm that their issues have been addressed and no further action is needed. This interception and validation process differs from situations in which cable operators experience and report wide spread service outages since noise issues more commonly cause degradation of service rather than loss of service and may affect different users in different ways. For this reason, noise-based outages are typically more difficult to identify and fix than wide spread outages.

The feedback data is first processed by instruction and feedback collection engine 206. In some embodiments, instruction and feedback collection engine 206 acts as an interface between noise localization architecture 202 and network technicians. In its role as the interface, instruction and feedback collection engine 206 is responsible for transmitting reports instructing the network technicians how to troubleshoot and document suspected network impairments and also for receiving the feedback data from the network technicians. In some embodiments, instruction and feedback collection engine 206 will transmit autonomous requests for additional feedback data from network technicians where data has been left blank, feedback data appears to be erroneous or where additional data collection is needed to properly determine which network components caused the network impairments. In some cases, instruction and feedback collection engine 206 may opt to send another technician to investigate a particular network component or a network segment when the actions of the first network technician either failed to fix the impairment or failed to properly document steps taken while troubleshooting the network component.

Instruction and feedback collection engine 206 is also responsible for sending feedback data back to data analysis engine 204 where, as described above, the feedback data can be used to train one or more of the noise localization algorithms. In some embodiments, instruction and feedback collection engine 206 can be responsible for using at least a portion of the feedback data to label the collected telemetry data with identified impaired network components that generated the noise identified by the collected telemetry data. Once labeled the collected telemetry is more easily able to be used as machine learning training data to improve the noise localization algorithms. In some embodiments, data analysis engine 204 is configured to perform some of the labeling of the collected telemetry data. Generally, data analysis engine 204 will be responsible for performing data labeling in more complex noise localization scenarios that might include multiple sources and/or different types of noise.

In addition to the interactions describe above data analysis engine 204 can also be configured to adjust the operation of data collection 105 and instructions and feedback collection engine 206 in response to development of the noise localization algorithms indicating that, e.g., a lower or higher noise localization metrics threshold should be used with data collection engine 105 or where instructions issued to the network technicians by instruction and feedback collection engine 206 be adjusted to perform troubleshooting more quickly or with greater accuracy. Furthermore, and as described herein, noise localization architecture 202 can be further developed by training the architecture using lab generated training data. In this way, noise localization architecture can be developed more quickly and efficiently and be capable of identifying and supplying and/or configured to identify and supply solutions to address problems that may have occurred infrequently or not have previously occurred at all on the operational HFC data network.

In some embodiments, a respective label comprises two portions: (1) a respective set of network conditions for the network and (2) a respective set of location information of modems in the network. Thus, a respective label corresponds to (e.g., includes and/or references) both information about the network conditions and the modem locations at a respective time.

In some embodiments, the respective set of network conditions are based on (e.g., are defined by) one or more impaired network components incorporated into one or more specific locations of the network, causing distortion and noise within the network and/or allowing noise to enter the network from outside the network. In some embodiments, one or more noise sources also emit noise into the environment surrounding the network (e.g., while the one or more impaired network components are part of the network). In some embodiments, the respective set of network conditions includes information about the one or more impaired network components (e.g., the types of the one or more impaired devices, how long the one or more devices have been impaired, the degree of impairment, and/or the location of the one or more impaired network components (e.g., in relation to other network components)).

In some embodiments, the respective set of location information of modems includes information about the topology of the network, the quantity of modems and/or other network components, the make/model of modems, respective distances between/among modems, and/or respective distances between modems and the CTMS.

Thus, a particular label is optionally applied to data that identifies a set of network conditions (e.g., including the quantity, type, and/or location of impaired network components where noise originates in the network and/or including the quantity, type, and/or location of noise sources emitting noise into the environment surrounding the network) and that identifies a set of location information of modems in the network. In some embodiments, the particular label is associated with telemetry data of the network (e.g., DOCSIS timing offsets, receive power, and/or transmit power of different network components).

By automating the introduction of different types of noise (e.g., different noise sources, different noise types, and/or different degrees of noise) into the network and collecting and labeling data corresponding to the respective set of network conditions and the respective set of location information of modems in the network while the different types of noise are introduced into the network, the system can generate data for various types of network conditions and label them appropriately.

In some embodiments, the set of network conditions includes characteristics of the noise (e.g., the noise type) and/or characteristics of the impaired network component (e.g., the impaired network component type). In some embodiments, a number (e.g., 5, 10, 50, 200, or 3,000) of noise sources and/or real-world impaired network components (e.g., impaired network components retrieved from deployed networks) are tested, characterized (e.g., to get characteristics of the noise and/or to get characteristics of the impaired network component), and cataloged for use in a simulated data network for use in labeling. In some embodiments, the set of network conditions includes the characterization of the noise sources and/or impaired network components included in the characterized network. In some embodiments, the set of network conditions includes the make/brands, models, and/or firmware of network components, such as cable modems, CMTSs, fiber nodes, amplifiers, and other passive network components such as splitters, directional couplers, taps. In some embodiments, the set of network conditions includes make/brand/type, length of cables, and/or make/brand/type of connectors. In some embodiments, the set of network conditions includes calibration data (e.g., for DOCSIS parameters) reported by the network components.

Various techniques can be used to determine the characteristics of the impaired network component (e.g., the impaired network component type). In some embodiments, the impaired network component is characterized by a description, such as "loose connector". However, such a description provides only limited information about the impaired network component. For example, an impaired network component that is a "loose connector" could refer to multiple different conditions, including different types of cable, different types of connectors, and different degrees of looseness of the connection of the cable to the connector. In some embodiments, the impaired network component is characterized a transmission line model, as described in detail below. In some embodiments, the impaired network component is characterized by network telemetry data and/or parameters (e.g., DOCSIS parameters and/or PNM parameters) obtained from the CMTS and/or from cable modems on the network, as described in detail below.

As shown in FIG. 2B1, an exemplary technique for characterizing the impaired network component as a transmission line model, in accordance with some embodiments. In the example of FIG. 2B1, a three-port transmission line model 210 uses S-parameters 210A to characterize the behavior of an impaired network component. In some embodiments, the three-port transmission line model characterizes the impaired network component as a transmission line with particular characteristics. In some embodiments, port 1 and port 2 of the transmission line model is based on (e.g., describes) the signal transmission and the signal reflection, and port 3 of the transmission line model is based on (e.g., describes) signal leakage and ingress. In some embodiments, port 1 of the transmission line model is based on (e.g., describes) the signal transmission, port 2 of the transmission line model is based on (e.g., describes) the signal reflection, and port 3 of the transmission line model is based on (e.g., describes) signal leakage and ingress. In some embodiments, the impaired network component is connected to a network analyzer and the S-parameters (e.g., less than all or all) are measured (e.g., without connecting the impaired network component to a simulated data network). In some embodiments, one or more of the S-parameters are captured over a range of frequencies (e.g., from 1 Mhz, 5 Mhz, or 20 Mhz to 50 MHz, 100 MHz, 200 MHz, 1.2 GHz, or 1.8 GHZ). In some embodiments, less than all of the S-parameters are used characterize the impaired network component. In some embodiments, all of the S-parameters are used characterize the impaired network component.

FIG. 2B2 illustrates exemplary S-parameters for a hardline coaxial cable with a broken radial shield, in accordance with some embodiments. Graph 212A illustrates the S21 parameter showing signal transmission at frequencies between 5 MHz and 100 MHz for the hardline coaxial cable with a broken radial shield. Graph 212B illustrates the S31 parameter showing signal leakage at frequencies between 5 MHz and 100 MHz for the hardline coaxial cable with a broken radial shield.

Figure 3:
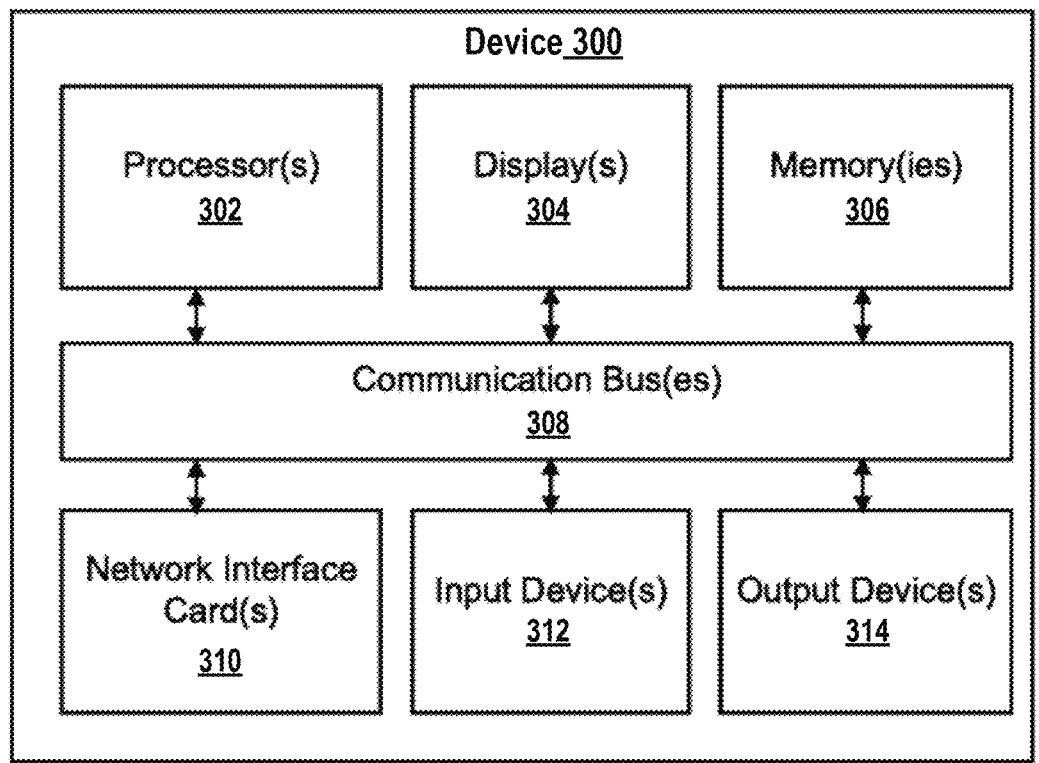

FIG. 2B3 illustrates exemplary S-parameters for a corroded power splitter, in accordance with some embodiments. Graph 214A illustrates the S21 parameter showing signal transmission at frequencies between 5 MHz and 100 MHz for the corroded power splitter. Graph 214B illustrates the S31 parameter showing signal leakage at frequencies between 5 MHz and 100 MHz for the corroded power splitter.

Figure 4:
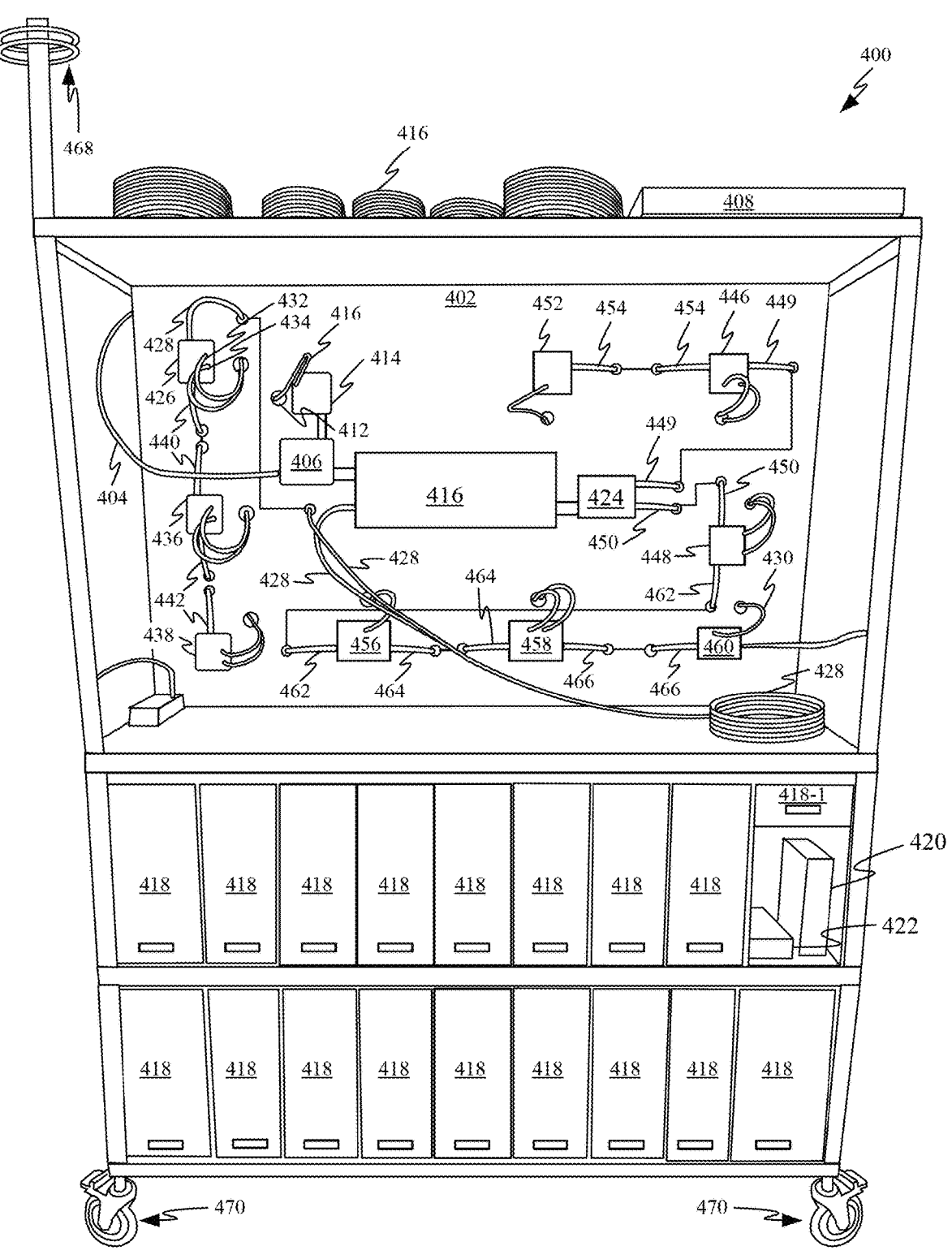
Figure 5A:
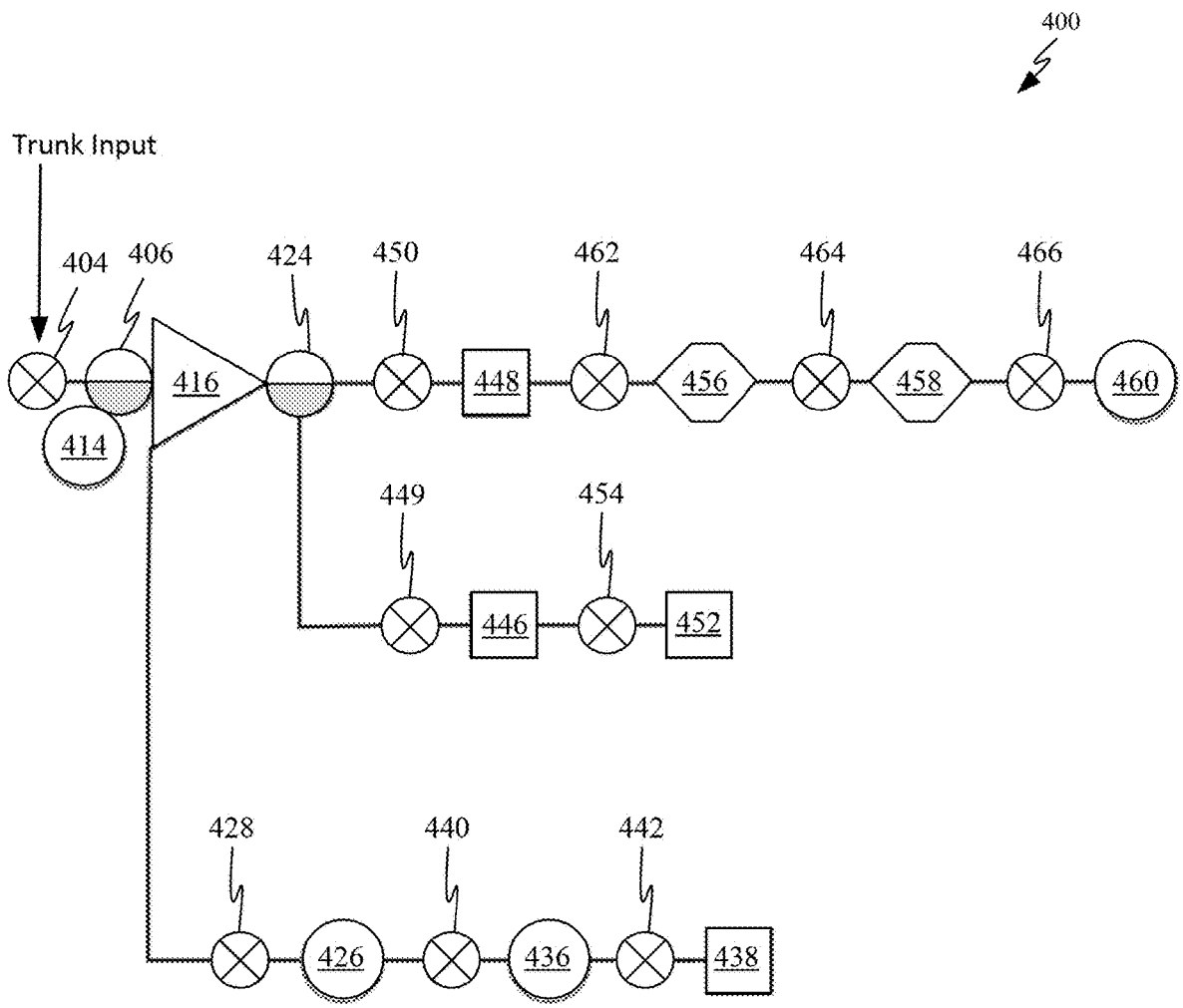
FIGS. 5A-5C show schematic views of movable carts configured to model various portions of an HFC data network.
Figure 5B:
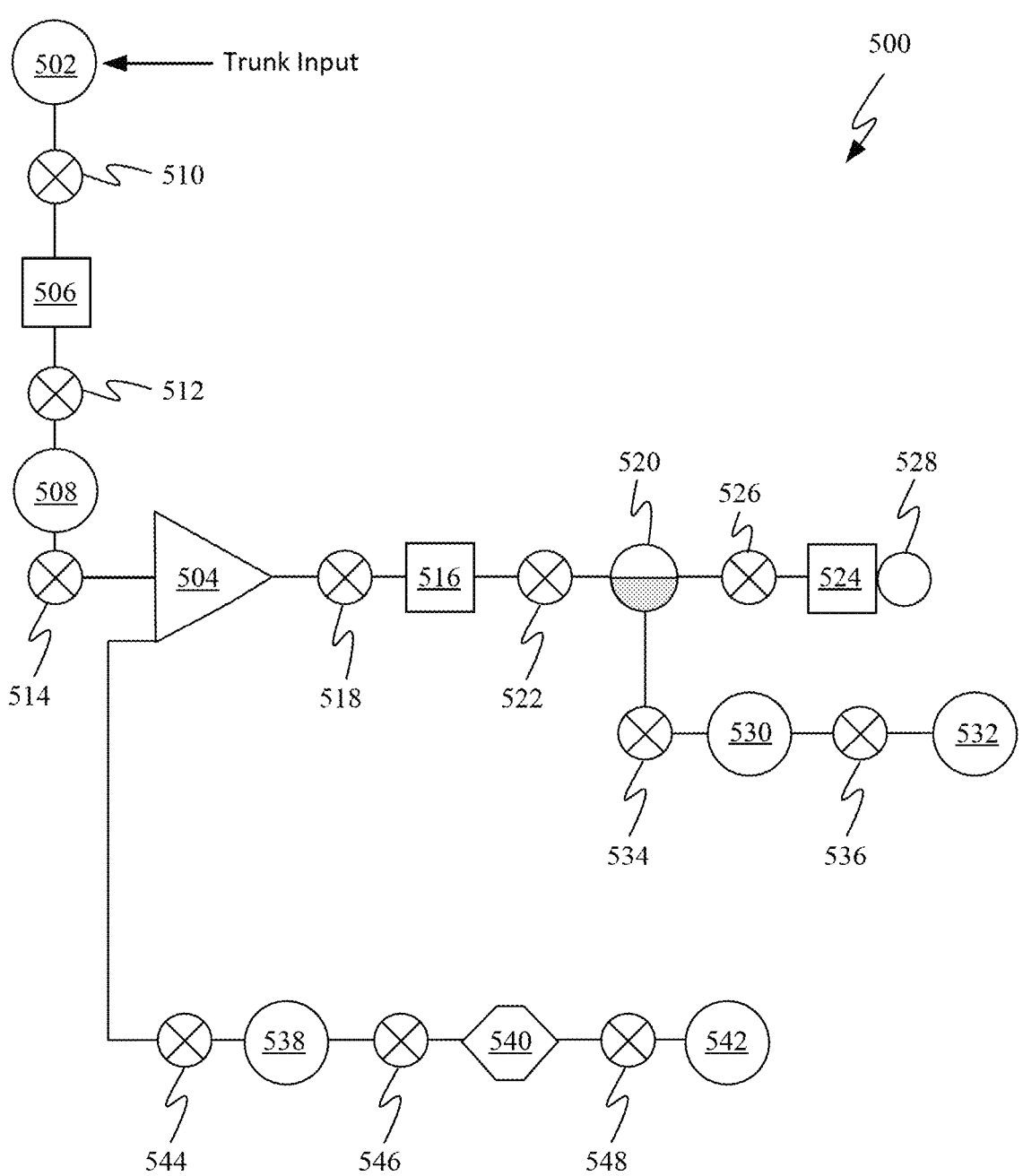

An exemplary technique for characterizing the impaired network component is by obtaining network telemetry data and/or parameters (e.g., DOCSIS parameters and/or PNM parameters) from the CMTS and/or from cable modems on the network. For example, the impaired network component is inserted into the simulated network (e.g., network as shown in FIGS. 4, 5A, 5B, and/or 5C) and network telemetry data and/or parameters are obtained from the CMTS and/or from cable modems on the data network (e.g., without using a separate network analyzer). In some embodiments, the parameters include one or more of: In-Channel Equalizer Frequency Response (ICEFR) (e.g., DOCSIS ICEFR) and Downstream Full Band Spectrum (e.g., for DOCSIS). In some embodiments, the parameters are collected from one, multiple, or all modems on the data network. In some embodiments, multiple modems affected (e.g., all modems affected) by this impaired network component exhibit similar parameters (e.g., similar ICEFR and/or similar downstream Full Band Spectrum).

FIGS. 2B4-1 and 2B4-2 illustrates exemplary In-Channel Equalizer Frequency Response (ICEFR) graphs for two distinct cable modems on the same network that are affected by a loose splice connector on a hardline coaxial cable, in accordance with some embodiments. Graph 216A illustrates the ICEFR for a first cable modem while the loose splice connector on a hardline coaxial cable is part of the data network. Graph 216B illustrates the ICEFR for a second cable modem, different from the first cable modem, while the loose splice connector on the hardline coaxial cable is part of the data network. As shown in FIGS. 2B4-1 and 2B4-2, different cable modems affected by the same impaired component have a similar (or the same) In-Channel Equalizer Frequency Response (ICEFR). Accordingly, the In-Channel Equalizer Frequency Response (ICEFR) can serve as a distinctive signature or characteristic of the impaired network component.

FIGS. 2B5-1 and 2B5-2 illustrate exemplary In-Channel Equalizer Frequency Response (ICEFR) graphs for two distinct cable modems on the same network that are affected by a defective tap, in accordance with some embodiments. Graph 218A illustrates the ICEFR for a third cable modem while the defective tap is part of the data network. Graph 218B illustrates the ICEFR for a fourth cable modem, different from the third cable modem, while the defective tap is part of the data network. As shown in FIGS. 2B5-1 and 2B5-2, different cable modems affected by the same impaired component have a similar (or the same) In-Channel Equalizer Frequency Response (ICEFR). Accordingly, the In-Channel Equalizer Frequency Response (ICEFR) can serve as a distinctive signature and/or characteristic of the impaired network component.

FIGS. 2B6-1 and 2B6-2 illustrate exemplary Full Band Downstream Spectrum graphs for two distinct cable modems on a network that includes a corroded tap, in accordance with some embodiments. Graph 220A illustrates the Full Band Downstream Spectrum from 5 MHz to about 1200 MHz (or 1800 MHZ) for a cable modem that is being affected by the corroded tap, thereby causing a suckout at around 575 MHz. Graph 220B illustrates the Full Band Downstream Spectrum from 5 MHz to 1000 MHz for a cable modem that is not being affected by the corroded tap, thereby not causing the suckout at around 575 MHz, even though the defective tap is part of the data network. Cable modems downstream of an impaired network component affecting the downstream spectrum exhibit a similar Full Band Spectrum. Accordingly, the Full Band Spectrum of the affected modem by an impaired network component can be used as a distinctive signature and/or characteristic of the impaired network component.

In some embodiments, the technique characterizes the impaired network component by using one or more (e.g., one, two, or all) of the techniques described above, including a description of the impaired network component, the transmission line model, and parameters (e.g., DOCSIS parameters and/or PNM parameters) obtained from the CMTS and/or from cable modems on the network (e.g., via analysis of the ICEFR and/or the Full Band Downstream Spectrum).

As described above, noise from the environment of the data network may enter the data network, potentially causing undesirable results. Typically, RF noise originates from various sources, such as household appliances, industrial machinery, and lighting. Each source of RF noise exhibits unique noise characteristics that can be identified. These characteristics vary widely, including impulse noise, white noise, and/or noise that is more pronounced at specific frequencies. The nature of the noise can be steady, fluctuating over time, and/or sporadic. Generic labels like "noise from a desk lamp" may be inadequate to characterize the noise because of the significant variations in noise, even among similar noise-causing sources. Accurately characterizing different types of noise ingress can provide significant benefits when analyzing a data network. In some embodiments, one or more parametric models are used to characterize noise. In some embodiments, a noise characterization model uses statistical parameters for different frequency bands of the noise spectrum. Such a noise characterization model is particularly helpful because noise spectrum can dynamically change or remain static over time for different frequency bands of the spectrum. In this model, the noise is characterized based on one or more (e.g., less than all or all) of the following parameters: the maximum spectrum of noise, the minimum spectrum of noise, the mean spectrum of noise, and the standard deviation of noise power at different (e.g., a plurality of) frequencies.

FIG. 2C1 illustrates exemplary maximum, mean and minimum noise spectrums 222 for different frequencies for a first noisy LED light, in accordance with some embodiments. FIG. 2C2 illustrates an exemplary noise spectrum standard deviation 224 for the first noisy LED light, in accordance with some embodiments.

FIG. 2C3 illustrates exemplary maximum, mean and minimum noise spectrums 226 for different frequencies for a second noisy LED light that is different from the first noise LED light, in accordance with some embodiments. FIG. 2C4 illustrates an exemplary noise spectrum standard deviation 228 for the second noisy LED light, in accordance with some embodiments.

In some embodiments, power levels and Modulation Error Ratio (MER) parameters are used for noise and impairment localization, as well as for network topology analysis. These parameters allow for the derivation of Noise Spectral Density (NSD) across different network segments, providing insights into noise origins within the data network. However, the process faces a significant challenge due to the complex, non-linear relationships between NSD, power level, and MER, which vary across different modem brands, models, hardware versions, and firmware. To account for the variance of different modem brands, models, hardware version, and/or firmware version, various devices are tested using a measurement setup and a calibration table is generated that corresponds different modem brands, models, hardware versions, and/or firmware versions to their respective the MER and power levels.

Using the characteristics described above, multiple labels are generated, with a first label corresponding to a first set of network conditions for the network and a first set of location information of modems in the network and a second label corresponding to a second set of network conditions for the network and a second set of location information of modems in the network. In some embodiments, numerous labels are generated, each corresponding to a respective set of network conditions for the network and a respective set of location information of modems in the network. The label and corresponding information are used to train one or more machine learning models for predicting and identifying one or more of: location(s) where noise is entering the data network, types of noise entering the data network, location(s) where nonlinear distortion is originated in a data network, types of nonlinear distortion such as CPD or amplifier saturation, location(s) of failed or impaired network components, type(s) of failed and/or impaired network components, impact of impaired network component(s) on the noise and distortion, cable modem health versus performance, and network topology.

FIG. 3 illustrates an exemplary electronic device (e.g., a server, a computer, and/or a network component), in accordance with some embodiments. In some examples, the techniques described herein can be performed at device 300. Device 300 is an electronic device with one or more processors 302, one or more displays 304, one or more memories 306, one or more network interface cards 310, one or more input devices (e.g., keyboard 312), one or more output device 314 (e.g., printer), connected via one or more communication buses 308. Many of elements of device 300 are optional, such as display 304, input devices 312, and output devices 314. Memories 306 can include random access memory, read-only memory, flash memory, and the like. Memory 306 can include a non-transitory computer-readable storage medium. The non-transitory computer-readable storage medium is configured to store one or more programs configured to be executed by the one or more processors 302 of device 300. The one or more programs optionally include instructions for performing the described techniques.

FIG. 4 shows an exemplary movable rack 400 capable of organizing and shielding and/or configured to organize and shield various network components capable of simulating and/or configured to simulate an HFC data network for test operation within a controlled lab environment. In particular, movable rack 400 includes a rear panel 402 with network components for modeling a trunk of the HFC data network mounted thereto. In some embodiments, rear panel 402 can be made of an electrically insulating material such as plywood. As depicted, test network traffic from a fiber node or another branch of the HFC network (i.e. a fiber node within a lab environment or another movable rack within the lab environment) is received from coaxial cable 404 at directional coupler 406. A traffic generator 408 is illustrated atop movable rack 400 and provides exemplary network traffic signals that can be broadcast upstream by CPE devices disposed within shielded enclosures 418. The exemplary network traffic generated by traffic generator 408 helps to establish an ordinary volume of network traffic on the network branch supported by movable rack 400. In some embodiments, the exemplary network traffic can be network traffic recorded from an operational data network to help with realism of the network traffic.

Directional coupler 406 is configured to route the test network traffic to network tap 414 and trunk amplifier 416.

Network tap 414 includes a coaxial cable 416 that acts as a drop cable for connecting network tap 414 to a CPE device located in one of shielded enclosures 418. Coaxial cable 416 can have a length corresponding to its actual length in an operational HFC data network by coiling and optionally placing a central portion of coaxial cable 416 atop movable rack 400 as depicted. Using coaxial cable 416 (and, optionally, other coaxial cables described herein) that is rolled up enables simulating various distances based on the length of coaxial cable 416. While shielded enclosures 418 can take many forms, shielded enclosures act effectively as faraday cages to prevent CPE devices or other network components disposed within them from being adversely affected by operation of other network components supported by movable rack 400 or other sources of electromagnetic interference (EMI) within the lab environment. Shielded enclosures 418 can also include shielded ports that prevent any cables routed into a respective shielded enclosure 418 from introducing EMI into the respective shielded enclosure 418. Shielded enclosure 418 is shown in an open state to illustrate how a CPE device 420 and optionally a drop amplifier 422 can be positioned within shielded enclosure 418-1. Drop amplifiers 422 are typically needed when a particularly long drop cable is used and/or when the signal strength at the network tap is too low to reach a particular CPE device.

Trunk amplifier 416 is configured to output the received test and exemplary network traffic to directional coupler 424 and to network tap 426, which ultimately lead to three different branches. The traffic is sent to network tap 426 via a coaxial cable 428, a central portion of which is coiled on a shelf that is optionally positioned directly beneath rear panel 402. Network tap 426 in turn is connected to two coaxial cables 432 and 434, which connect network tap 426 to two CPE devices located within respective shielded enclosures 418 to the network components mounted on rear panel 402. Network tap 426 is also in electrical communication with network taps 436 and 438 via coaxial cables 440 and 442. In a similar manner, network taps 436 and 438 can each be connected to two CPE devices disposed within shielded enclosures 418.

Directional coupler 424 sends the traffic receive from trunk amplifier 416 to network tap 448 and network tap 446 via respective coaxial cables 449 and 450. Coaxial cables 449 and 450 are also shown extending through openings in rear panel 402 and also can be of a length typically used in an operational HFC data network. While coils of central portions of coaxial cables 449 and 450 are not depicted, in some embodiments, these coiled cables can be hung from pegs on a rear-facing surface of rear panel 402. As described in the preceding paragraph, network tap 446 is in electrical communication with network tap 452 via coaxial cable 454 and network tap 448 is in electrical communication with network taps 456, 458 and 460 via coaxial cables 462, 464 and 466. In some embodiments, the components of movable rack 400 are connected to the input of another movable rack such as movable rack 400, 500, and/or 550. In some embodiments, 2, 3, 4 or 5 racks are connected via respective connections.

Other features of movable rack 400 include antenna 468, which can be configured to operate in a few different ways. When the lab environment is not shielded from ambient RF signals, antenna 468 can be configured to measure ambient FM radio waves so that the effect of the ambient FM radio waves on any of the network components carried by movable rack 400 can be removed to improve the quality of any telemetry data gathered. Alternatively, antenna 468 can be configured to create ambient noise within the lab environment to help more closely approximate conditions in an operational HFC data network by transmitting FM or LTE radio waves. In some embodiments, movable rack 400 can include multiple antennas configured to receive or broadcast FM, LTE or other cellular signals to further model and/or collect normal ambient conditions for an HFC data network. Movable rack 400 is also depicted including wheels 470, which allow for movable rack 400 to be repositioned within the lab environment. In some embodiments, the lab environment can include shielding enclosures large enough to allow movable rack 400 to be placed within so that movable rack 400 can be isolated from RF interference generated by network components supported by other movable racks supporting other parts of an HFC network or any other possible unintentional sources of noise present in the lab environment.

Testing personnel can introduce noise into the network components supported by movable rack 400 in the lab in a variety of ways. One way of making sure that a consistent coupling between the impairment source and the affected network component is to use an antenna to capture noise from a noise source. The antenna may be different for different types of noise and the source that emits the noise. Some examples of antenna (but not limited to) are the following: a coil of wire wrapped around the source of noise, for example a noisy power adapter, a short wave radio dipole antenna; a short wave radio coil antenna; and an FM antenna. The noise captured by the antenna can then be transmitted to the affected network component or components to create a desired impairment condition in at least the following ways: antenna wire directly connected to the shielding of a coaxial cable going to the network component(s); antenna wire placed in parallel with a coaxial cable going to the network component(s); antenna wire connected to another antenna to transmit the noise in the air, which then will be received by the network component(s); and antenna wire connected to another antenna to transmit the noise inside a reflective enclosure with the network component(s) inside it, which then will be received by the impairment.

One type of condition the laboratory environment is particularly good at monitoring is a time varying impairment, which is quite difficult to monitor in an operational environment due to the condition often not being caught or identified at an early stage. It is important to have training data representative of each stage of a time varying impairment in order for an AI driven system to be able to spot and identify time varying impairments at its different stages. For example, a network component exposed to water develops corrosion over a period of time and its electrical characteristics change in time. When a wet corroded network component becomes dry over a certain period of time its electrical characteristics changes. Other environmental factors can affect the impairment over time, for example, the effect of temperatures on a wet cable when it goes below freezing point can be significant. Wind can have a notable effect on a loose amplifier connector. The time varying impairments also must be simulated and properly labeled at their various severities to allow machine learning algorithms to properly identify these types of impairments regardless of what stage or severity a particular impairment is in. This allows identification of the issue at an early stage and for an HFC data network operator to be able to schedule a maintenance action to occur before the impaired component is projected to cause an impairment having a substantial effect on the customers relying on the HFC data network.

Impairment in network components generally fall in the following categories: (1) physical damage; (2) water damage; (3) fiber node misalignment; (4) amplifier misalignment; and (5) in-home impairments. Physical damage impairments include physical damage to the cable and connector (e.g., loose connectors and adapters, cable radial shield cracked, center connector dirty, center connector too long, damaged cable-crushed, damaged cable-sharply bent, damaged cable-hole in the shield), physical damage to the fiber node (e.g., damaged FN cover, damaged or missing seal), physical damage to the amplifier (e.g., damaged amplifier cover, damaged or missing seal), physical damage to the directional coupler/splitter (e.g., damaged cover, damaged or missing seal), physical damage to the power injector (e.g. damaged cover or damaged or missing seal, physical damage to network taps (e.g., damaged covers or damaged or missing seals).

Water damage impairments include water damage to the cable and connector, water damage to the fiber node, water damage to the amplifier, water damage to the directional coupler/splitter, water damage to the power injector and water damage to the network taps. Water damage to these network components generally takes the form of water within the network component, corrosion within the network component and wet or dry corrosion on any of the seals of the network component.

Fiber node misalignment typically takes the form of fiber node input amplifier overload, fiber node input amplifier underload or fiber node laser clipping. Amplifier misalignment is generally shown by amplifier overload or underload. Fiber node misalignment and amplifier misalignment generally cause signal degradation. This degradation can be similar to the effect on the network caused by other sources of noise as they all tend to cause reduction in signal quality and increases in bit error rate. Consequently, having training data capable of accurately characterizing the noise generated by fiber or amplifier misalignments helps distinguish misalignment conditions from other types of noise present in an HFC data network.

In-home impairments typically are caused by problems with the drop cable, various in-home network components and various interference generated within a customer's premises and various defects of the customer's CPE device.

Each of the aforementioned impairment types would generally be characterized with telemetry data labeled in accordance with the type of impairment being simulated, the location of the impairment (impaired network components) and the type of noise generated. Sometimes, a simulation can include multiple types of impairments causing multiple types of noise being originated from different locations. For example, a primary impairment substantially responsible for causing an outage or degradation in service could be masked or obscured in part by other less serious impairment types. By simulating multiple impairments concurrently in this way and using the resulting training data to train an AI based impairment identification system, such as the one described in FIG. 2, these unusual impairments can be quickly understood by the AI based impairment identification system and properly addressed quickly without having to do time-consuming investigation.

Figure 5C:
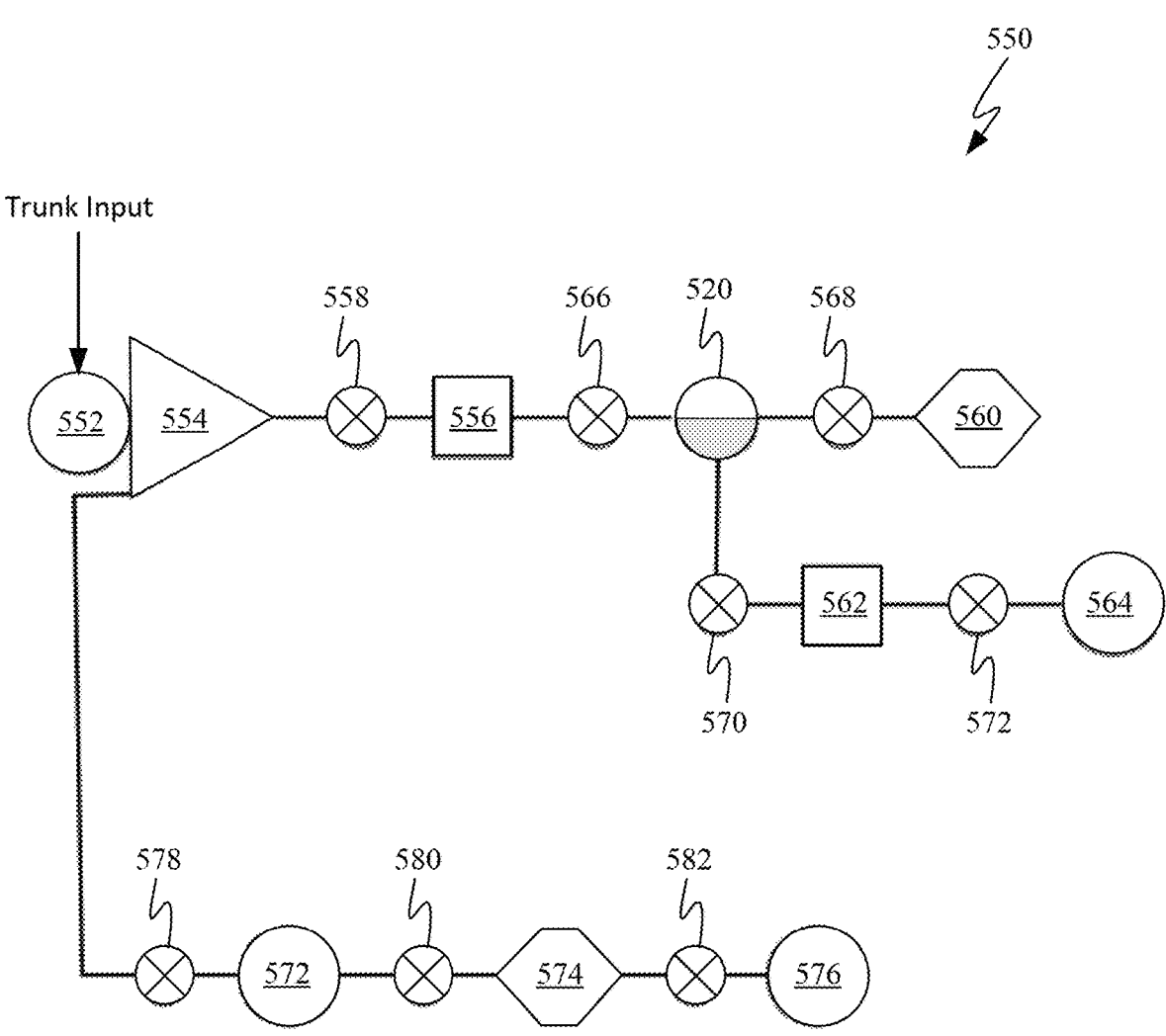

FIGS. 5A-5C show schematic illustrations of three exemplary movable rack configurations. FIG. 5A is a schematic illustration of movable rack 400 shown in FIG. 4. The description of the schematic illustration of movable rack 400 will be brief since the routing of signals has already been described in the text accompanying FIG. 4. It should be noted that CPE devices are not depicted in FIG. 5A so that focus can remain on the network components forming this trunk of the HFC data network and that each depicted network tap is connected by drop cable and sometimes a drop amplifier to at least one CPE device. The network taps can also be connected to one or more set top boxes for streaming digital television. It should also be noted that the network taps have different shapes that indicate different types of network taps. In particular, hexagonally-shaped network taps indicate the network tap has eight terminals for drop cables, square-shaped network taps indicate the network tap has four terminals for drop cables and circular-shaped network taps indicate the network tap has two terminals for drop cables. The length of coaxial cables running between network components can optionally be varied to more accurately model a particular HFC data network. The coaxial cables for the HFC data network trunk depicted in FIG. 5A are typically outdoor rated cables of type RG-6 and have the following lengths: coaxial cable 404 is 50 ft, coaxial cable 428 is 200 ft, coaxial cable 440 is 200 ft, coaxial cable 442 is 200 ft, coaxial cable 450 is 200 ft, coaxial cable 462 is 200 ft, coaxial cable 464 is 50 ft, coaxial cable 466 is 50 ft, coaxial cable 449 is 200 ft and coaxial cable 454 is 100 ft.

FIG. 5B shows a schematic view of movable rack 500. Trunk input signals are configured to enter network components of movable rack 500 through network tap 502 and progress to trunk amplifier 504 through network taps 506 and 508 and coaxial cables 510, 512 and 514. In some embodiments, coaxial cables 510, 512 and 514 can each have a length of about 100 ft. Trunk amplifier 504 is configured to boost the strength of the trunk input so that the signal is able to propagate through the cabling and network taps associated with the two outputs of trunk amplifier 504. A first output of trunk amplifier 504 goes to network tap 516 by way of coaxial cable 518, which can have a length of 200 ft. Signals exiting network tap 516 then travel to directional coupler 520 by way of coaxial cable 522. Directional coupler 520 routes network traffic to two different branches. A first branch off directional coupler 520 includes network tap 524, which receives a signal from directional coupler 520 by way of coaxial cable 526. Network tap 524 is coupled to power injector 528 without an intervening coaxial cable run. Power injector 528 can be added at the end of this branch to allow for the end of this branch to be connected to the input of another movable rack such as movable rack 400, 500 and/or 550. In some embodiments, 2, 3, 4 or 5 racks are connected via respective power injectors (e.g., power injector 528). A second branch off directional coupler 520 includes network taps 530 and 532, which are in communication with directional coupler 520 by way of coaxial cables 534 and 536. A second output of trunk amplifier 504 goes to network taps 538, 540 and 542 by way of coaxial cables 544, 546 and 548.

FIG. 5C shows a schematic view of movable rack 550. Trunk input signals enter network components of movable rack 550 through network tap 552, which outputs to trunk amplifier 554 without running through a coaxial cable. This models a configuration in which network tap 552 is co-located with trunk amplifier 554. Trunk amplifier 554 has two outputs. A first one of the outputs runs to network tap 556 through coaxial cable 558 and subsequently to network taps 560, 562 and 564, via directional coupler 520 and coaxial cables 566, 568, 570 and 572. A second one of the outputs of trunk amplifier 554 runs to network taps 572, 574 and 576 via coaxial cables 578, 580 and 582. As has been shown, each of the movable racks 400, 500 and 550 have different configurations that allows the movable racks to model different trunks and branches of an exemplary HFC data network.

Figure 6A:
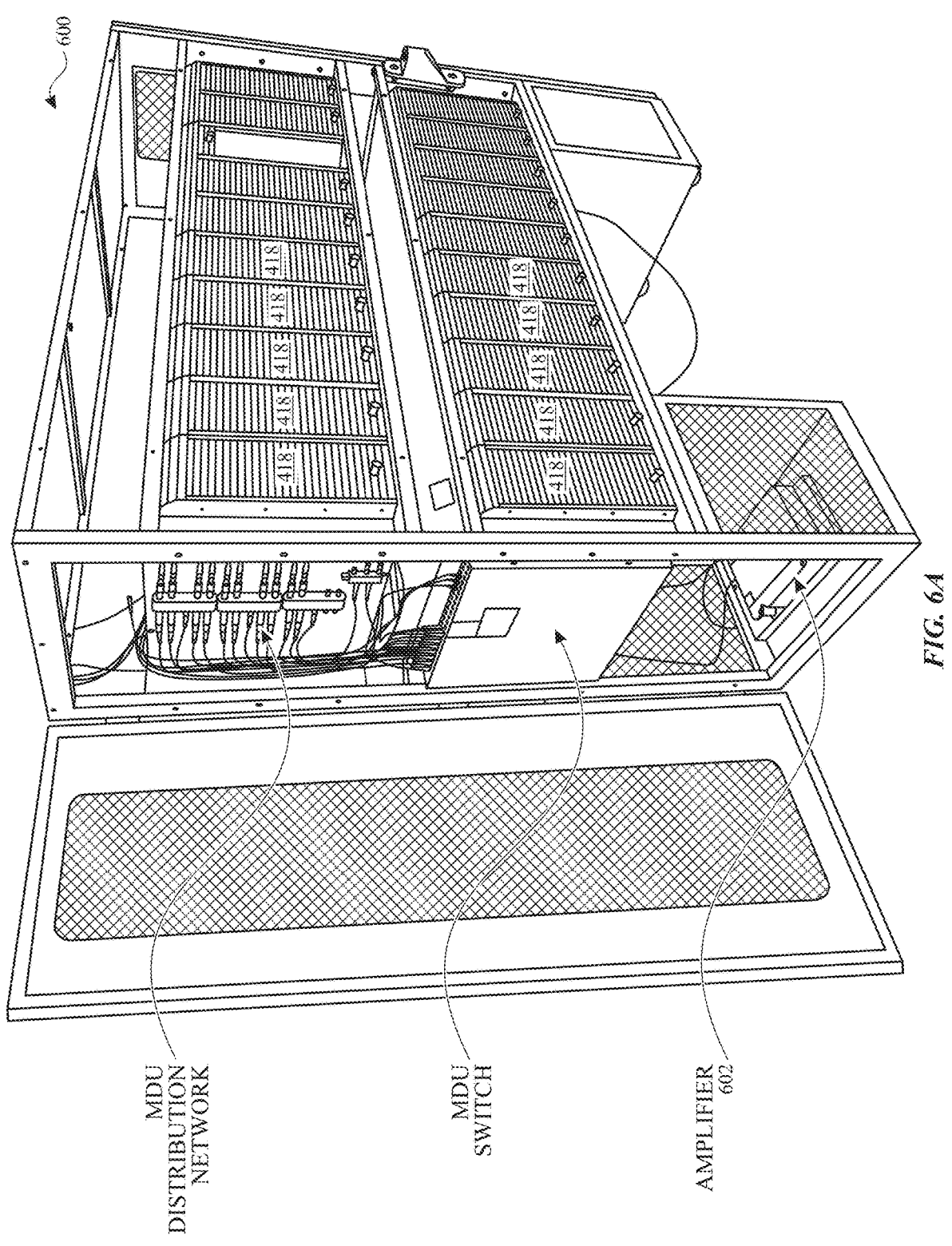
FIGS. 6A-6B show an exemplary movable cart configured to model the network components used to connect a multi-dwelling unit to an HFC data network.
Figure 6B:
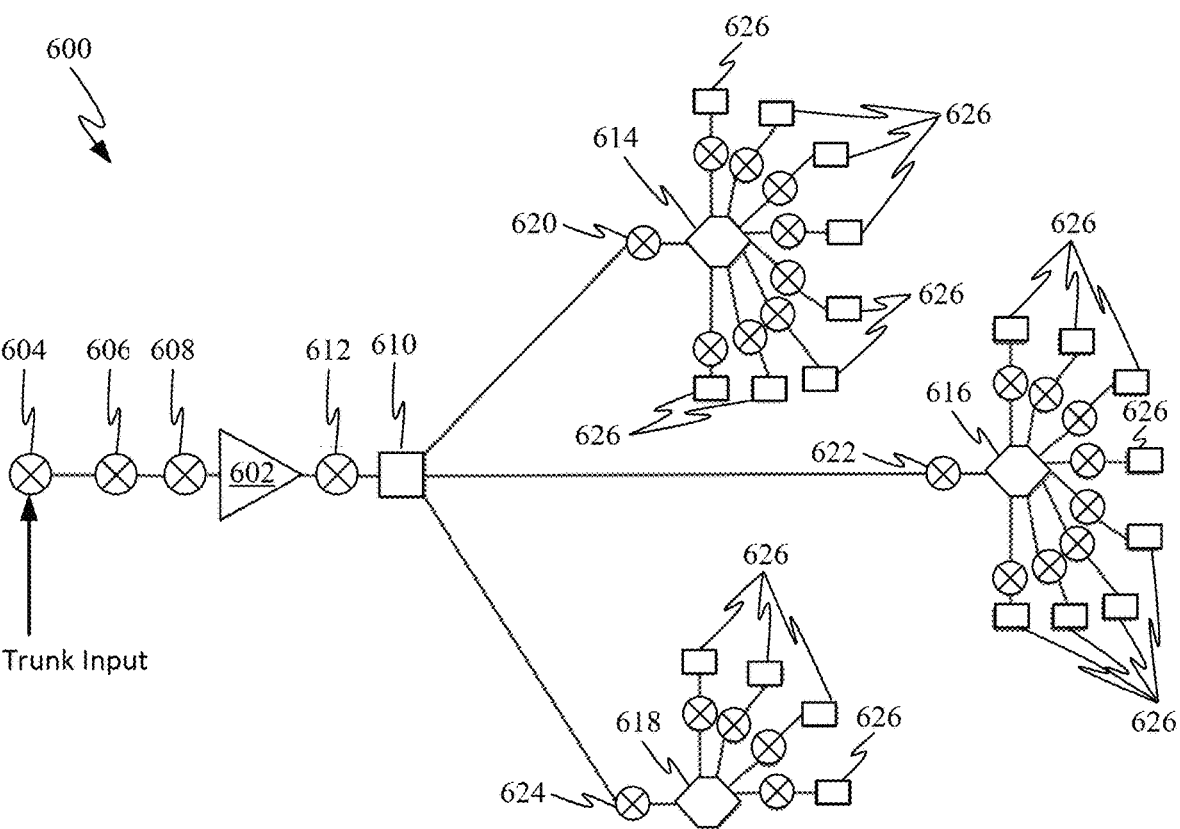

FIGS. 6A-6B show photographic and schematic views of a multi-dwelling unit (MDU) rack 600 that is configured to model impairments that can occur inside one or more buildings, such as an apartment building or cluster of condos. These configurations tend to have different configurations due to the close proximity of dwelling units in these types of housing units. In particular, FIG. 6A shows how MDU rack 600 includes an MDU amplifier 602, an MDU distribution network comprised of a series of splitters and an MDU switch configured to route signals as needed to the various CPE devices disposed within shielded enclosures 418. The MDU switch is used to introduce signals from a traffic generator similar to traffic generator 408 described in conjunction with FIG. 4.

FIG. 6B shows a schematic view of MDU rack 600. In particular, MDU rack 600 includes a series of connected co-axial cables 604, 606 and 608 to model the routing needed to get to the electronics room associated with a particular apartment building or complex of condominiums. MDU amplifier 602 has a single output to network tap 610 via coaxial cable 612. Network tap 610 outputs to three different network taps 614, 616 and 618 via patch cables 620, 622 and 624. In some embodiments, patch cables can have a length of between three and five feet. Network taps 614, 616 and 618 can each include eight terminals for connecting to large numbers of CPE devices 626 located in close proximity.

Figure 7:
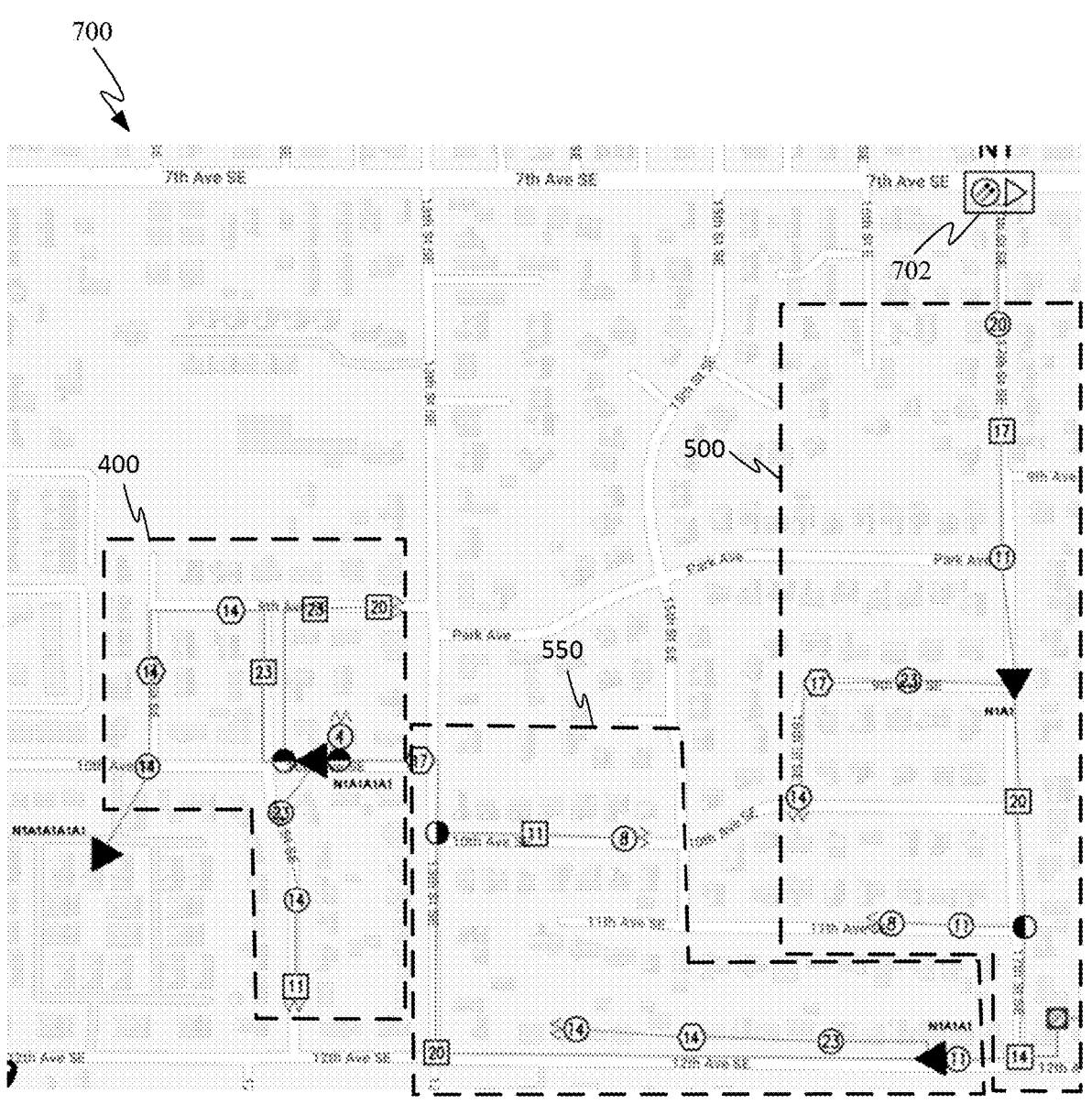
FIG. 7 shows an exemplary operational HPC data network, its location relative to a residential neighborhood and which portions of the exemplary operational network can be simulated by the network components carried by the movable carts depicted in FIGS. 4-5C.

FIG. 7 shows how the network components supported by movable racks 400, 500 and 550 cooperatively simulate an HFC data network 700. In particular, HFC data network 700 includes a fiber node 702 that feeds into a first region of HFC data network 700 simulated by the network components carried by movable rack 500. A second region of HFC data network is simulated by the network components of movable cart 550 and a third region of HFC data network 700 can be simulated by the network components of movable rack 400 as depicted in FIG. 7 by the dashed region that highlight the network components simulated by each movable cart. FIG. 7 also illustrates how the various network components of a respective movable cart are ordinarily distributed across multiple city blocks.

FIG. 8 is a flow diagram illustrating method 800 for analyzing a data network, such as by using a computer system, in accordance with some embodiments. Method 800 is optionally fully or partially performed at a computer system (e.g., with one or more processors and memory storing instructions for performing the method). Some operations in method 800 are, optionally, combined, the orders of some operations are, optionally, changed, and some operations are, optionally, omitted.

As described below, method 800 provides robust technique for analyzing a data network. The method reduces the cognitive burden on a user for managing and analyzing data networks.

The technique includes creating (802) a first network condition (e.g., adding an impaired network component and/or introducing noise) in a first data network (e.g., a simulated data network and/or a data network formed in a lab environment for testing purposes), wherein the first network condition impairs operation of one or more network components (e.g., a cable modem, a splitter, and/or a coax cable) of the first data network.

While the first network condition impairs the operation of one or more network components of the first data network, the technique records (804) first telemetry data produced by a plurality of network components (e.g., one or more network components that have impaired operation due to the first network condition and/or one or more network components that do not have impaired operation due to the first network condition) of the first data network. The technique includes recording (806) (e.g., before, after, and/or while the first network condition is part of the first data network) topology information about the first data network.

The technique includes associating (808) the first telemetry data with a characterization of the first network condition and the topology information about the first data network (e.g., without associating the first telemetry data with a characterization of a second network condition that is different from the first network condition and/or topology information about a second data network that is different from the first data network) and training (810) one or more machine learning models using the first telemetry data in association with the characterization of the first network condition and the topology information about the first data network.

In some embodiments, creating the first network condition in the first data network comprises including a first impaired network component. In some embodiments, examples of an impaired network component include network components with physical damage, with water damage, that have fiber node misalignment, that have amplifier misalignment; and/or are in-home impaired network components. In some embodiments, creating the first network condition in the first data network comprises submersing at least a portion of a respective network component in water.

In some embodiments, the technique includes characterizing the first impaired network component using a transmission line model to determine a characterization of the first impaired network component, wherein the characterization of the first network condition is based on (e.g., uses and/or is the same as) the characterization of the first impaired network component. In some embodiments, a respective impaired network component is characterized while the respective impaired network component is not part of the first data network.

In some embodiments, creating the first network condition in the first data network comprises introducing first noise (e.g., generated by a noise source) into the first data network. In some embodiments, examples of noise sources that introduce noise into a data network include: household appliances, LED lights in the environment of the data network, and RF transmitters in the environment of the data network.

In some embodiments, the technique includes characterizing the first noise using statistical parameters for different frequency bands of the first noise (e.g., the maximum spectrum of noise, the minimum spectrum of noise, the mean spectrum of noise, and/or the standard deviation of noise power at different (e.g., a plurality of) frequencies) to determine a characterization of the first noise, wherein the characterization of the first network condition is based on (e.g., uses and/or is the same as) the characterization of the first noise. In some embodiments, a respective noise and/or noise source is characterized independent of the first data network.

In some embodiments, recording topology information about the first data network comprises recording a make, a model, and/or a version (e.g., a software version and/or a firmware version) of (e.g., of all or less than all) network components (e.g., one or more network components that have impaired operation due to the first network condition and/or one or more network components that do not have impaired operation due to the first network condition) of the first data network.

In some embodiments, recording topology information about the first data network comprises recording locations (e.g., relative to other network components and/or absolute locations) of (e.g., of all or less than all) network components (e.g., one or more network components that have impaired operation due to the first network condition and/or one or more network components that do not have impaired operation due to the first network condition) of the first data network. In some embodiments, recording topology information about the first data network comprises recording information about how network components of the first data network are interconnected.

In some embodiments, recording topology information about the first data network comprises recording cable distances (e.g., in meters and/or in miles) between network components (e.g., one or more network components that have impaired operation due to the first network condition and/or one or more network components that do not have impaired operation due to the first network condition) of the first data network. In some embodiments, recording topology information about the first data network comprises recording information about how network components of the first data network are interconnected.

In some embodiments, the first data network is contained in a laboratory environment. In some embodiments, the first data network is a simulated data network (e.g., a data network with physical components and connections, but that is not a deployed network). In some embodiments, impaired network component is disposed within a first shielded enclosure that isolates the impaired network component from a plurality of network components of the first data network and another network component is disposed within a second shielded enclosure that isolates the another network component from the plurality of network components of the first data network. In some embodiments, the shielded enclosures are faraday cages.

In some embodiments, the technique includes: creating a second network condition (e.g., adding an impaired network component and/or introducing noise), different from the first network condition, in the first data network (e.g., a simulated data network and/or a data network formed in a lab environment for testing purposes), wherein the second network condition impairs operation of one or more network components (e.g., a cable modem, a splitter, and/or a coax cable) of the first data network; while the second network condition impairs the operation of one or more network components of the first data network, recording second telemetry data produced by a plurality of network components (e.g., one or more network components that have impaired operation due to the second network condition and/or one or more network components that do not have impaired operation due to the second network condition) of the first data network; associating the second telemetry data with a characterization of the second network condition and the topology information about the first data network (e.g., without associating the second telemetry data with a characterization of the first network condition and/or topology information about a second data network that is different from the first data network); and training the one or more machine learning models using the second telemetry data in association with the characterization of the second network condition and the topology information about the first data network.

In some embodiments, the technique includes: creating a third network condition (e.g., the same as or different from the first network condition and/or the second network condition) (e.g., adding an impaired network component and/or introducing noise) in a second data network (e.g., a simulated data network and/or a data network formed in a lab environment for testing purposes), different from the first data network, wherein the third network condition impairs operation of one or more network components (e.g., a cable modem, a splitter, and/or a coax cable) of the second data network; while the third network condition impairs the operation of one or more network components of the second data network, recording third telemetry data produced by a plurality of network components (e.g., one or more network components that have impaired operation due to the third network condition and/or one or more network components that do not have impaired operation due to the third network condition) of the second data network; recording (e.g., before, after, and/or while the third network condition is part of the second data network) topology information about the second data network; associating the third telemetry data with a characterization of the third network condition and the topology information about the second data network (e.g., without associating the third telemetry data with a characterization of a first/second network condition and/or topology information about the first data network); and training the one or more machine learning models using the third telemetry data in association with the characterization of the third network condition and the topology information about the second data network.

In some embodiments, the technique includes: recording telemetry data produced by a plurality of network components of a deployed data network (e.g., that is operating with active users) (e.g., different from the first and second data networks); recording topology information about the deployed data network (e.g., wherein the topology information is generated based on the telemetry data and/or based on records of the data network); associating the telemetry data produced by the plurality of network components of the deployed data network with the topology information about the deployed data network; and using one or more machine learning models (e.g., that were training using the first telemetry data, the second telemetry data, and/or the third telemetry data) to determine one or more characteristics of a network condition (e.g., an impaired network component and/or noise) in the deployed data network. In some embodiments, the one or more characteristics includes a location of noise entering the deployed data network and/or a location of an impaired network component in the deployed data network. In some embodiments, the one or more characteristics includes a type, make, model, and/or version of an impaired network component in the deployed data network. In some embodiments, the one or more characteristics includes a type of noise entering the deployed data network.

In some embodiments, a computer system receives first telemetry data produced by a plurality of network components of a first data network that includes a first network condition that impairs operation of one or more network components of the first data network, wherein the first telemetry data was produced while the first network condition impairs the operation of one or more network components of the first data network. The computer system receives and/or determines topology information about the first data network, wherein the topology information about the first data network is associated with a characterization of the first network condition and the topology information about the first data network. The computer system uses the first telemetry data in association with the characterization of the first network condition and the topology information about the first data network to train one or more machine learning models. In some embodiments, the computer system trains the one or more machine learning models on a plurality of respective telemetry data (e.g., second, third, and/or fourth) in association with respective characterizations of respective network conditions (e.g., second, third, and/or fourth) and topology information (e.g., second, third, and or fourth) about the respective data networks. In some embodiments, these techniques are implemented by instructions of one or more computer programs stored on one or more computer-readable storage media. In some embodiments, these techniques are implemented by a computer system that includes one or more processors and memory that stores instructions for performing the techniques.

In some embodiments, a method is performed at a computer system. The method comprises: receiving first telemetry data produced by a plurality of network components of a first data network that includes a first network condition that impairs operation of one or more network components of the first data network, wherein the first telemetry data was produced while the first network condition impairs the operation of one or more network components of the first data network; receiving topology information about the first data network, wherein the topology information about the first data network is associated with a characterization of the first network condition and the first telemetry data; and training one or more machine learning models using the first telemetry data in association with the characterization of the first network condition and the topology information about the first data network. In some embodiments, the method performed at the computer system further comprises: receiving second telemetry data produced by a plurality of network components of a second data network, different from the first data network, that includes a second network condition, different from the first network condition, that impairs operation of one or more network components of the second data network, wherein the second telemetry data was produced while the second network condition impairs the operation of one or more network components of the second data network; receiving topology information about the second data network, wherein the topology information about the second data network is associated with a characterization of the second network condition and the second telemetry data; and training the one or more machine learning models using the second telemetry data in association with the characterization of the second network condition and the topology information about the second data network. In some embodiments, the method performed at the computer system further comprises: receiving telemetry data produced by a plurality of network components of a deployed data network that is different from the first data network and the second data network; receiving topology information about the deployed data network; associating the telemetry data produced by the plurality of network components of the deployed data network with the topology information about the deployed data network; and using the one or more machine learning models that have been trained using the first telemetry data and the second telemetry data to determine one or more characteristics of a network condition in the deployed data network, wherein the one or more characteristics of the network condition in the deployed data network includes a location of the network condition in the deployed data network and/or a type of the network condition. In some embodiments, these techniques are implemented by instructions of one or more computer programs stored on one or more computer-readable storage media. In some embodiments, these techniques are implemented by a computer system that includes one or more processors and memory that stores instructions for performing the techniques.

The foregoing description has been described with reference to specific embodiments. However, the illustrative discussions above are not intended to be exhaustive or to limit the invention to the precise forms described. Many modifications and variations are possible in view of the above teachings. Others skilled in the art are thereby enabled to best utilize the techniques and various embodiments with various modifications as suited to various uses.

Although the disclosure and examples have been described with reference to the accompanying drawings, it is to be noted that various changes and modifications will become apparent to those skilled in the art. Such changes and modifications are to be understood as being included within the scope of the disclosure.

What is claimed is:

1. A method, comprising:

creating a first network condition in a first data network, wherein the first network condition impairs operation of one or more network components of the first data network;

while the first network condition impairs the operation of one or more network components of the first data network, recording first telemetry data produced by a plurality of network components of the first data network;

recording topology information about the first data network;

associating the first telemetry data with a characterization of the first network condition and the topology information about the first data network; and training one or more machine learning models using the first telemetry data in association with the characterization of the first network condition and the topology information about the first data network.

2. The method of claim 1, wherein creating the first network condition in the first data network comprises including a first impaired network component.

3. The method of claim 2, further comprising:

characterizing the first impaired network component using a transmission line model to determine a characterization of the first impaired network component, wherein the characterization of the first network condition is based on the characterization of the first impaired network component.

4. The method of claim 1, wherein creating the first network condition in the first data network comprises introducing first noise into the first data network.

5. The method of claim 4, further comprising:

characterizing the first noise using statistical parameters for different frequency bands of the first noise to determine a characterization of the first noise, wherein the characterization of the first network condition is based on the characterization of the first noise.

6. The method of claim 1, wherein recording topology information about the first data network comprises recording a make, a model, and/or a version of network components of the first data network.

7. The method of claim 1, wherein recording topology information about the first data network comprises recording locations of network components of the first data network.

8. The method of claim 1, wherein recording topology information about the first data network comprises recording cable distances between network components of the first data network.

9. The method of claim 1, wherein the first data network is contained in a laboratory environment.

10. The method of claim 1, further comprising:

creating a second network condition, different from the first network condition, in the first data network, wherein the second network condition impairs operation of one or more network components of the first data network;

while the second network condition impairs the operation of one or more network components of the first data network, recording second telemetry data produced by a plurality of network components of the first data network;

associating the second telemetry data with a characterization of the second network condition and the topology information about the first data network; and training the one or more machine learning models using the second telemetry data in association with the characterization of the second network condition and the topology information about the first data network.

11. The method of claim 1, further comprising:

creating a second network condition in a second data network, different from the first data network, wherein the second network condition impairs operation of one or more network components of the second data network;

while the second network condition impairs the operation of one or more network components of the second data network, recording second telemetry data produced by a plurality of network components of the second data network;

recording topology information about the second data network;

associating the second telemetry data with a characterization of the second network condition and the topology information about the second data network; and training the one or more machine learning models using the second telemetry data in association with the characterization of the second network condition and the topology information about the second data network.

12. The method of claim 1, further comprising:

recording telemetry data produced by a plurality of network components of a deployed data network;

recording topology information about the deployed data network;

associating the telemetry data produced by the plurality of network components of the deployed data network with the topology information about the deployed data network; and using one or more machine learning models to determine one or more characteristics of a network condition in the deployed data network.

13. A method, comprising:

receiving first telemetry data produced by a plurality of network components of a first data network that includes a first network condition that impairs operation of one or more network components of the first data network, wherein the first telemetry data was produced while the first network condition impairs the operation of one or more network components of the first data network;

receiving topology information about the first data network, wherein the topology information about the first data network is associated with a characterization of the first network condition and the first telemetry data; and training one or more machine learning models using the first telemetry data in association with the characterization of the first network condition and the topology information about the first data network.

14. The method of claim 13, further comprising:

receiving second telemetry data produced by a plurality of network components of a second data network, different from the first data network, that includes a second network condition, different from the first network condition, that impairs operation of one or more network components of the second data network, wherein the second telemetry data was produced while the second network condition impairs the operation of one or more network components of the second data network;

receiving topology information about the second data network, wherein the topology information about the second data network is associated with a characterization of the second network condition and the second telemetry data; and training the one or more machine learning models using the second telemetry data in association with the characterization of the second network condition and the topology information about the second data network.

15. The method of claim 14, further comprising:

receiving telemetry data produced by a plurality of network components of a deployed data network that is different from the first data network and the second data network;

receiving topology information about the deployed data network;

associating the telemetry data produced by the plurality of network components of the deployed data network with the topology information about the deployed data network; and using the one or more machine learning models that have been trained using the first telemetry data and the second telemetry data to determine one or more characteristics of a network condition in the deployed data network.

16. The method of claim 15, wherein the one or more characteristics of the network condition in the deployed data network includes a location of the network condition in the deployed data network and/or a type of the network condition.

17. A non-transitory computer-readable storage medium storing one or more programs configured to be executed by one or more processors, the one or more programs including instructions for:

receiving first telemetry data produced by a plurality of network components of a first data network that includes a first network condition that impairs operation of one or more network components of the first data network, wherein the first telemetry data was produced while the first network condition impairs the operation of one or more network components of the first data network;

receiving topology information about the first data network, wherein the topology information about the first data network is associated with a characterization of the first network condition and the first telemetry data; and training one or more machine learning models using the first telemetry data in association with the characterization of the first network condition and the topology information about the first data network.

18. The non-transitory computer-readable storage medium of claim 17, the one or more programs including instructions for:

receiving second telemetry data produced by a plurality of network components of a second data network, different from the first data network, that includes a second network condition, different from the first network condition, that impairs operation of one or more network components of the second data network, wherein the second telemetry data was produced while the second network condition impairs the operation of one or more network components of the second data network;

receiving topology information about the second data network, wherein the topology information about the second data network is associated with a characterization of the second network condition and the second telemetry data; and training the one or more machine learning models using the second telemetry data in association with the characterization of the second network condition and the topology information about the second data network.

19. The non-transitory computer-readable storage medium of claim 18, the one or more programs including instructions for:

receiving telemetry data produced by a plurality of network components of a deployed data network that is different from the first data network and the second data network;

receiving topology information about the deployed data network;

associating the telemetry data produced by the plurality of network components of the deployed data network with the topology information about the deployed data network; and using the one or more machine learning models that have been trained using the first telemetry data and the second telemetry data to determine one or more characteristics of a network condition in the deployed data network.

20. The non-transitory computer-readable storage medium of claim 19, wherein the one or more characteristics of the network condition in the deployed data network includes a location of the network condition in the deployed data network and/or a type of the network condition.

* * * * *